US011671444B2

(12) United States Patent
Waplington

(10) Patent No.: US 11,671,444 B2
(45) Date of Patent: *Jun. 6, 2023

(54) MATCHING CONFIGURATION ITEMS WITH MACHINE LEARNING

(71) Applicant: ServiceNow, Inc., Santa Clara, CA (US)

(72) Inventor: Brian James Waplington, San Diego, CA (US)

(73) Assignee: ServiceNow, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/931,381

(22) Filed: Sep. 12, 2022

(65) Prior Publication Data

US 2023/0007039 A1  Jan. 5, 2023

Related U.S. Application Data

(63) Continuation of application No. 16/897,991, filed on Jun. 10, 2020, now Pat. No. 11,470,107.

(51) Int. Cl.
*H04L 9/40* (2022.01)
*G06N 5/04* (2023.01)
(Continued)

(52) U.S. Cl.
CPC .......... *H04L 63/1433* (2013.01); *G06N 5/04* (2013.01); *G06N 20/00* (2019.01)

(58) Field of Classification Search
CPC ...... H04L 63/1433; G06N 5/04; G06N 20/00; G06N 3/045; G06N 3/08
See application file for complete search history.

(56) References Cited

U.S. PATENT DOCUMENTS

| 4,941,084 A | 7/1990 | Terada et al. |
| 5,185,860 A | 2/1993 | Wu |

(Continued)

FOREIGN PATENT DOCUMENTS

| EP | 0433979 | 6/1991 |
| EP | 1607824 | 12/2005 |

(Continued)

OTHER PUBLICATIONS

Agarwal et al., "Sentence Boundary Detection Using a MaxEnt Classifier," Proceedings of the 12th Conference of MISC, 2005, pp. 1-6.

(Continued)

*Primary Examiner* — Harry H Kim
(74) *Attorney, Agent, or Firm* — McDonnell Boehnen Hulbert & Berghoff LLP

(57) ABSTRACT

A system includes persistent storage containing configuration items (CIs) representing discovered attribute values of computing resources associated with a managed network, and an application configured to perform operations, including obtaining test result data generated based on a third-party scanning system executing tests of a particular computing resource associated with the managed network. The test result data includes attribute values of the particular computing resource. The operations also include generating, by way of an embedding model and based on the attribute values, an embedding vector representing the attribute values, and comparing the embedding vector to a plurality of candidate embedding vectors, each representing the discovered attribute values of a corresponding CI of the CIs. The operations further include, based on comparing the embedding vector to the plurality of candidate embedding vectors, selecting a particular CI of the CIs, and updating the particular CI to additionally represent the test result data.

20 Claims, 12 Drawing Sheets

(51) Int. Cl.
  *G06N 20/00* (2019.01)
  *G06N 3/08* (2023.01)

(56) References Cited

U.S. PATENT DOCUMENTS

| | | | |
|---|---|---|---|
| 5,237,518 A | 8/1993 | Sztipanovits et al. | |
| 5,261,097 A | 11/1993 | Saxon | |
| 5,265,252 A | 11/1993 | Rawson, III et al. | |
| 5,367,685 A | 11/1994 | Gosling | |
| 5,390,297 A | 2/1995 | Barber et al. | |
| 5,442,791 A | 8/1995 | Wrabetz et al. | |
| 5,452,415 A | 9/1995 | Hotka | |
| 5,522,042 A | 5/1996 | Fee et al. | |
| 5,533,116 A | 7/1996 | Vesterinen | |
| 5,655,081 A | 8/1997 | Bonnell et al. | |
| 5,659,736 A | 8/1997 | Hasegawa et al. | |
| 5,671,412 A | 9/1997 | Christiano | |
| 5,696,701 A | 12/1997 | Burgess et al. | |
| 5,715,463 A | 2/1998 | Merkin | |
| 5,745,879 A | 4/1998 | Wyman | |
| 5,761,502 A | 6/1998 | Jacobs | |
| 5,764,913 A | 6/1998 | Jancke et al. | |
| 5,887,139 A | 3/1999 | Madison, Jr. et al. | |
| 5,909,217 A | 6/1999 | Bereiter | |
| 5,937,165 A | 8/1999 | Schwaller et al. | |
| 5,949,976 A | 9/1999 | Chappelle | |
| 5,978,594 A | 11/1999 | Bonnell et al. | |
| 6,021,437 A | 2/2000 | Chen et al. | |
| 6,041,347 A | 3/2000 | Harsham et al. | |
| 6,088,717 A | 7/2000 | Reed et al. | |
| 6,101,500 A | 8/2000 | Lau | |
| 6,128,016 A | 10/2000 | Coelho et al. | |
| 6,131,118 A | 10/2000 | Stupek, Jr. et al. | |
| 6,134,581 A | 10/2000 | Ismael et al. | |
| 6,138,122 A | 10/2000 | Smith et al. | |
| 6,148,335 A | 11/2000 | Haggard et al. | |
| 6,166,732 A | 12/2000 | Mitchell et al. | |
| 6,167,448 A | 12/2000 | Hemphill et al. | |
| 6,175,866 B1 | 1/2001 | Holloway et al. | |
| 6,175,878 B1 | 1/2001 | Seaman et al. | |
| 6,260,050 B1 | 7/2001 | Yost et al. | |
| 6,263,457 B1 | 7/2001 | Anderson et al. | |
| 6,272,150 B1 | 8/2001 | Hrastar et al. | |
| 6,336,138 B1 | 1/2002 | Caswell et al. | |
| 6,363,421 B2 | 3/2002 | Barker et al. | |
| 6,393,386 B1 | 5/2002 | Zager et al. | |
| 6,397,245 B1 | 5/2002 | Johnson, II et al. | |
| 6,434,626 B1 | 8/2002 | Prakash et al. | |
| 6,438,592 B1 | 8/2002 | Killian | |
| 6,456,306 B1 | 9/2002 | Chin et al. | |
| 6,466,932 B1 | 10/2002 | Dennis et al. | |
| 6,487,590 B1 | 11/2002 | Foley et al. | |
| 6,505,248 B1 | 1/2003 | Casper et al. | |
| 6,526,442 B1 | 2/2003 | Stupek, Jr. et al. | |
| 6,621,823 B1 | 9/2003 | Mellquist et al. | |
| 6,707,795 B1 | 3/2004 | Noorhosseini et al. | |
| 6,742,015 B1 | 5/2004 | Bowman-Amuah | |
| 6,763,380 B1 | 7/2004 | Mayton et al. | |
| 6,816,898 B1 | 11/2004 | Scarpelli et al. | |
| 6,895,586 B1 | 5/2005 | Brasher et al. | |
| 6,948,175 B1 | 9/2005 | Fong et al. | |
| 6,985,901 B1 | 1/2006 | Sachse et al. | |
| 7,003,564 B2 | 2/2006 | Greuel et al. | |
| 7,028,228 B1 | 4/2006 | Lovy et al. | |
| 7,043,537 B1 | 5/2006 | Pratt | |
| 7,043,661 B2 | 5/2006 | Valadarsky et al. | |
| 7,062,683 B2 | 6/2006 | Warpenburg et al. | |
| 7,096,459 B2 | 8/2006 | Keller et al. | |
| 7,146,574 B2 | 12/2006 | Goldthwaite et al. | |
| 7,197,466 B1 | 3/2007 | Peterson et al. | |
| 7,215,360 B2 | 5/2007 | Gupta | |
| 7,216,304 B1 | 5/2007 | Gourdol et al. | |
| 7,219,085 B2 | 5/2007 | Buck et al. | |
| 7,222,147 B1 | 5/2007 | Black et al. | |
| 7,281,170 B2 | 10/2007 | Taylor et al. | |
| 7,412,502 B2 | 8/2008 | Fearn et al. | |
| 7,505,872 B2 | 3/2009 | Keller et al. | |
| 7,593,013 B2 | 9/2009 | Agutter et al. | |
| 7,596,716 B2 | 9/2009 | Frost et al. | |
| 7,617,073 B2 | 11/2009 | Trinon et al. | |
| 7,660,731 B2 | 2/2010 | Chaddha et al. | |
| 7,676,294 B2 | 3/2010 | Baier et al. | |
| 7,676,437 B2 | 3/2010 | Satkunanathan et al. | |
| 7,840,490 B1 | 11/2010 | Sellers et al. | |
| 7,877,783 B1 | 1/2011 | Cline et al. | |
| 7,890,869 B1 | 2/2011 | Mayer et al. | |
| 7,966,398 B2 | 6/2011 | Wiles, Jr. | |
| 8,060,396 B1 | 11/2011 | Bessler et al. | |
| 8,196,210 B2 | 6/2012 | Sterin | |
| 8,321,948 B2 | 11/2012 | Robinson et al. | |
| 8,407,669 B2 | 3/2013 | Yee et al. | |
| 8,554,750 B2 | 10/2013 | Rangarajan et al. | |
| 8,595,647 B2 | 11/2013 | Sabin et al. | |
| 8,620,818 B2 | 12/2013 | Hughes et al. | |
| 8,646,093 B2 | 2/2014 | Myers et al. | |
| 8,674,992 B2 | 3/2014 | Poston et al. | |
| 8,725,647 B2 | 5/2014 | Disciascio et al. | |
| 9,053,460 B2 | 6/2015 | Gilbert et al. | |
| 9,749,408 B2 * | 8/2017 | Subramani | H04L 67/1095 |
| 10,984,666 B1 * | 4/2021 | Depaolo | G06F 16/337 |
| 11,228,490 B1 * | 1/2022 | Carroll | H04L 41/0856 |
| 11,470,107 B2 * | 10/2022 | Waplington | G06N 3/08 |
| 2002/0116340 A1 | 8/2002 | Hellberg et al. | |
| 2002/0133584 A1 | 9/2002 | Greuel et al. | |
| 2002/0158969 A1 | 10/2002 | Gupta | |
| 2003/0118087 A1 | 6/2003 | Goldthwaite et al. | |
| 2003/0200293 A1 | 10/2003 | Fearn et al. | |
| 2005/0015217 A1 | 1/2005 | Weidl et al. | |
| 2005/0091356 A1 | 4/2005 | Izzo | |
| 2006/0026453 A1 | 2/2006 | Frost et al. | |
| 2006/0095461 A1 | 5/2006 | Raymond | |
| 2006/0156032 A1 * | 7/2006 | Panjwani | H04L 63/1433 713/191 |
| 2006/0179058 A1 | 8/2006 | Bram et al. | |
| 2006/0293942 A1 | 12/2006 | Chaddha et al. | |
| 2007/0033279 A1 | 2/2007 | Battat et al. | |
| 2007/0188494 A1 | 8/2007 | Agutter et al. | |
| 2007/0288389 A1 | 12/2007 | Vaughan et al. | |
| 2008/0082968 A1 | 4/2008 | Chang et al. | |
| 2008/0133289 A1 | 6/2008 | Armour et al. | |
| 2008/0148253 A1 | 6/2008 | Badwe et al. | |
| 2008/0319779 A1 | 12/2008 | Hughes et al. | |
| 2009/0088875 A1 | 4/2009 | Baier et al. | |
| 2009/0228984 A1 | 9/2009 | Sterin | |
| 2010/0110932 A1 | 5/2010 | Doran et al. | |
| 2017/0337749 A1 * | 11/2017 | Nerurkar | G06F 3/017 |
| 2018/0122136 A1 * | 5/2018 | Lynen | G06F 3/038 |
| 2019/0347423 A1 * | 11/2019 | Sanossian | G06F 21/56 |
| 2020/0053116 A1 * | 2/2020 | Soroush | H04L 43/045 |
| 2020/0202170 A1 * | 6/2020 | Basu | G06N 20/00 |
| 2021/0271975 A1 * | 9/2021 | Chen | G06N 3/04 |

FOREIGN PATENT DOCUMENTS

| | | |
|---|---|---|
| WO | 99/34285 | 7/1999 |
| WO | 00/52559 | 9/2000 |
| WO | 01/79970 | 10/2001 |

OTHER PUBLICATIONS

Ai et al., "Analysis of the Paragraph Vector Model for Information Retrieval," Proceedings of the 2016 ACM International Conference on the Theory of Information Retrieval (ICTIR '16), Sep. 12-16, 2016, Newark, DE, USA, 10 pages.

Dai et al., "Document Embedding with Paragraph Vectors," preprint, Jul. 2015, 8 pages.

"How Does Doc2Vec Represent Feature Vector of a Document?," https://www.quora.com/How-does-doc2vec-represent-feature-vector-of-a-document-Can-anyone-explain-mathematically-how-the-process-is-done (downloaded from public Internet site Sep. 18, 2018), 5 pages.

(56) References Cited

OTHER PUBLICATIONS

Le et al., "Distributed Representations of Sentences and Documents," Proceedings of the 31st International Conference on Machine Learning, Beijing, China, 2014, 9 pages, vol. 32.
Mikolov et al., "Distributed Representations of Words and Phrases and their Compositionality," NIPS'13 Proceedings of the 26th International Conference on Neural Information Processing Systems, Dec. 2013, 9 pages.
Sajjad et al., "Tagging Urdu Text with Parts of Speech: A Tagger Comparison," Proceedings of the 12th Conference of the European Chapter of the ACL, 2009, pp. 692-700.
Servicenow, "Madrid Security Incident Management," last updated May 14, 2019, 315 pages.
Servicenow, "New York IT Service Management," last updated Oct. 17, 2019, downloaded from http://docs.servicenow.com, 267 pages.
Servicenow, "New York Security Incident Management," last updated Oct. 21, 2019, downloaded from http://docs.servicenow.com., 400 pages.
Shperber, Gidi, "A Gentle Introduction to Doc2Vec," https://medium.com/scaleabout/a-gentle-introduction-to-doc2vec-db3e8c0cce5e (downloaded from public Internet site Sep. 18, 2018), 11 pages.
Tensorflow, "Vector Representations of Words," https://www.tensorflow.org/tutorials/word2vec (downloaded from public Internet site Jan. 21, 2018), 12 pages.
Notice of Allowance from U.S. Appl. No. 16/902,996, dated Jul. 6, 2022.

\* cited by examiner

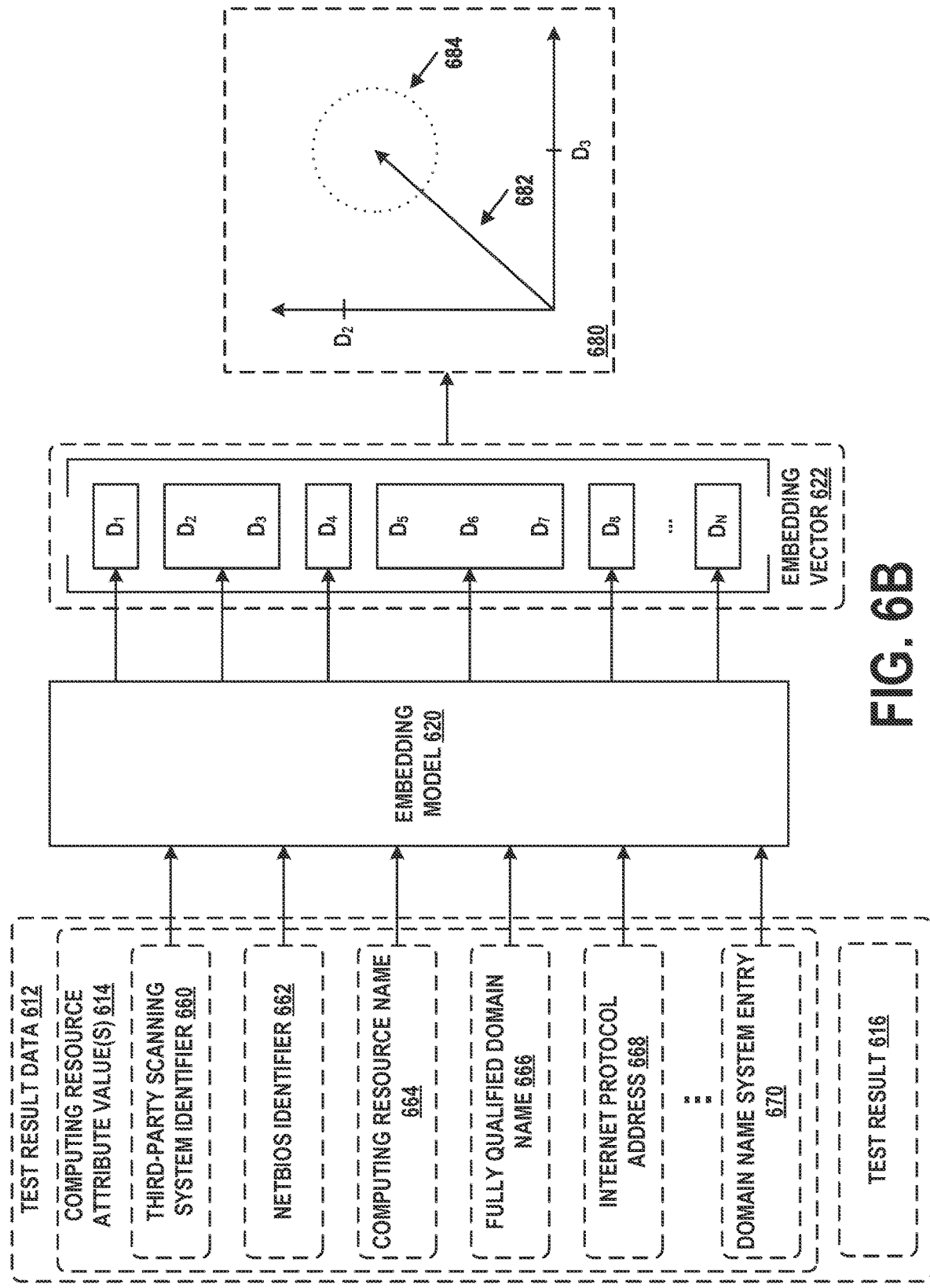

MATCHING CONFIGURATION ITEMS WITH MACHINE LEARNING

CROSS-REFERENCE TO RELATED APPLICATIONS

This application is a continuation of and claims priority to U.S. patent application Ser. No. 16/897,991, filed Jun. 10, 2020, and titled "Matching Configuration Items with Machine Learning," which is hereby incorporated by reference as if fully set forth in this description.

BACKGROUND

A managed network may utilize the services of various computing systems. These computing systems may perform various operations with respect to the computing resources that make up the managed network, including testing the computing resources and collecting information about the computing resources. Each computing system may represent and/or store the collected information according to different formats, syntaxes, and/or rules. Thus, accurately matching a first set of information collected for a given computing resource by a first computing system with a second set of information collected for the given computing resource by a second computing system is difficult.

SUMMARY

A remote network management platform may be used to manage a managed network. One aspect of this management may involve discovery of the various computing resources that make up the managed network and mapping of relationships between the computing resources. The remote network management platform may represent the discovered and mapped computing resources as configuration items (CIs), which may be stored in a configuration management database (CMDB). Specifically, the CIs may represent the discovered attribute values of various properties and aspects of the computing resources, including the relationships therebetween. Thus, the CMDB may store a representation of the various computing resources that make up the managed network.

The managed network may also utilize various services provided by third-party systems other than the remote network management platform. For example, the managed network may utilize a third-party vulnerability scanning system configured to identify vulnerabilities in the computing resources of the managed network. Other third-party systems may provide other types of services. The third-party systems may generate test result data that represents the results of tests, reviews, searches, or other analyses performed by the third-party system on the computing resources of the managed network. It may be desirable to integrate the test result data generated for a particular computing resource with the CI that represents the particular computing resource in the CMDB. Thus, the CMDB may provide a centralized location to store and manage data generated by various systems with respect to the particular computing resource.

The test result data generated by the third-party systems may include attribute values that at least partially identify the tested computing resource. However, the attribute values may be generated by the third-party system according to a format, syntax, and/or rules different from the format, syntax, and/or rules used by the remote network management platform when generating the discovered attribute values of the CIs. Thus, a rule-based approach for matching the tested computing resource with its corresponding CI may sometimes fail due to these formatting, syntactical, and/or rule differences. Writing additional rules that account for all possible formatting, syntactical, and/or rule variations may be impractical, especially where multiple third-party systems are involved, where these systems may change over time, and/or where the number of rules and/or variations thereof is large.

Accordingly, an application is provided that uses an embedding model to generate embedding vectors that represent the various attribute values of the tested computing resource and the CIs. The embedding model may be trained, based on the CIs stored in the CMDB of a given managed network, to group related/similar CIs together, and spread apart CIs that are unrelated and/or different. Thus, rather than comparing the attribute values to one another directly, the application compares the embedding vector of the tested computing resource to a plurality of candidate embedding vectors of the CIs stored in the CMDB. Based on this comparison of the embedding vectors, the application may determine which CI of these CIs most likely corresponds to the computing resource tested by the third-party system. Rather than relying on predefined rules to account for formatting and syntactical differences, the application measures a distance between two embedding vectors to quantify how similar the underlying sets of attributes are to one another.

In some implementations, each attribute value may be represented by one or more corresponding dimensions of the embedding vector, and this representation may be exclusive of other attribute values. That is, for example, a first attribute value may be represented by a first dimension of the embedding vector and a second attribute value may be represented by a second dimension of the embedding vector, but the second attribute value might not affect the value of the first dimension and the first attribute value might not affect the value of the second dimension. Thus, when a third-party system provides less than a complete set of attribute values, the embedding vectors may be compared with respect to the dimensions for which attribute values have been provided, but not with respect to dimensions for which the third-party system did not specify an attribute value. Accordingly, in addition to handling syntactical variations, the application is also able to match the tested computing resource to a CI when some attribute values are missing.

Further, each managed network may be associated with its own embedding model. That is, the embedding model of a given managed network may be trained based on the CIs associated with the given managed network, thus allowing the embedding model to learn which computing resources in the given managed network are considered similar/related and which are considered different/unrelated. Thus, when generating an embedding value for a computing resource tested by the third-party system based on the attribute values provided by the third-party system, the embedding model may generate an embedding vector that accurately represents the tested computing resource in the context of the given managed network.

Accordingly, a first example embodiment may involve obtaining test result data generated based on a third-party scanning system executing one or more tests of a particular computing resource associated with a managed network. The test result data may include one or more attribute values of the particular computing resource. Persistent storage disposed within a remote network management platform may contain CIs representing discovered attribute values of computing resources associated with the managed network. The first example embodiment may also involve generating, by way of an embedding model and based on the one or more attribute values of the particular computing resource, an embedding vector representing the one or more attribute values of the particular computing resource. The first example embodiment may additionally involve comparing the embedding vector to a plurality of candidate embedding vectors. Each respective candidate embedding vector of the plurality of candidate embedding vectors may represent the discovered attribute values of a corresponding CI of the CIs contained in the persistent storage. The first example embodiment may further involve, based on comparing the embedding vector to the plurality of candidate embedding vectors, selecting a particular CI of the CIs contained in the persistent storage. The first example embodiment may yet further involve updating the particular CI to additionally represent at least a portion of the test result data.

In a second example embodiment, persistent storage may be disposed within a remote network management platform and may contain CIs representing discovered attribute values of computing resources associated with a managed network. An application may be configured to perform operations including obtaining test result data generated based on a third-party scanning system executing one or more tests of a particular computing resource associated with the managed network. The test result data may include one or more attribute values of the particular computing resource. The operations may also include generating, by way of an embedding model and based on the one or more attribute values of the particular computing resource, an embedding vector representing the one or more attribute values of the particular computing resource. The operations may additionally include comparing the embedding vector to a plurality of candidate embedding vectors. Each respective candidate embedding vector of the plurality of candidate embedding vectors may represent the discovered attribute values of a corresponding CI of the CIs contained in the persistent storage. The operations may further include, based on comparing the embedding vector to the plurality of candidate embedding vectors, selecting a particular CI of the CIs contained in the persistent storage. The operations may yet further include updating the particular CI to additionally represent at least a portion of the test result data.

In a third example embodiment, an article of manufacture may include a non-transitory computer-readable medium, having stored thereon program instructions that, upon execution by a computing system, cause the computing system to perform operations in accordance with the first example embodiment or the second example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment or the second example embodiment.

In a fifth example embodiment, a system may include various means for carrying out each of the operations of the first example embodiment or the second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6B illustrates an embedding vector, in accordance with example embodiments.

DETAILED DESCRIPTION

Figure 1:
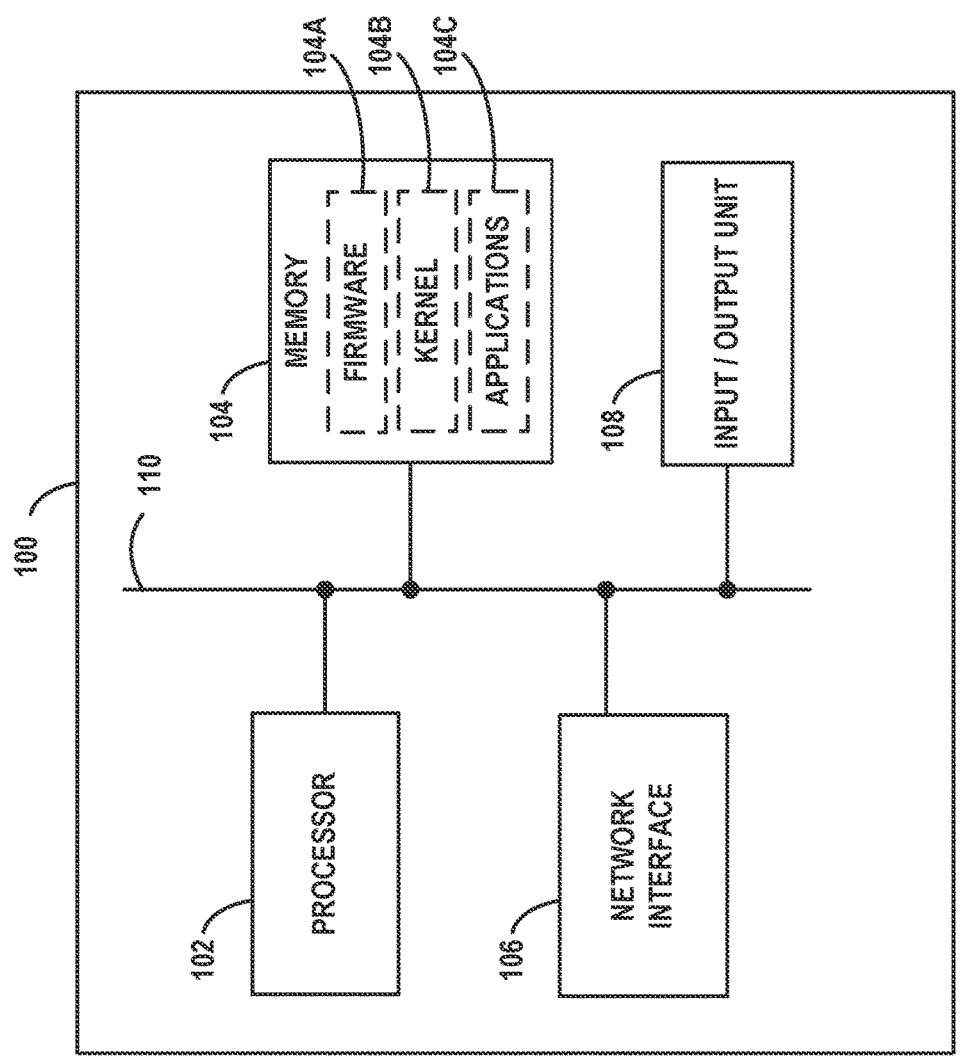
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation"

thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
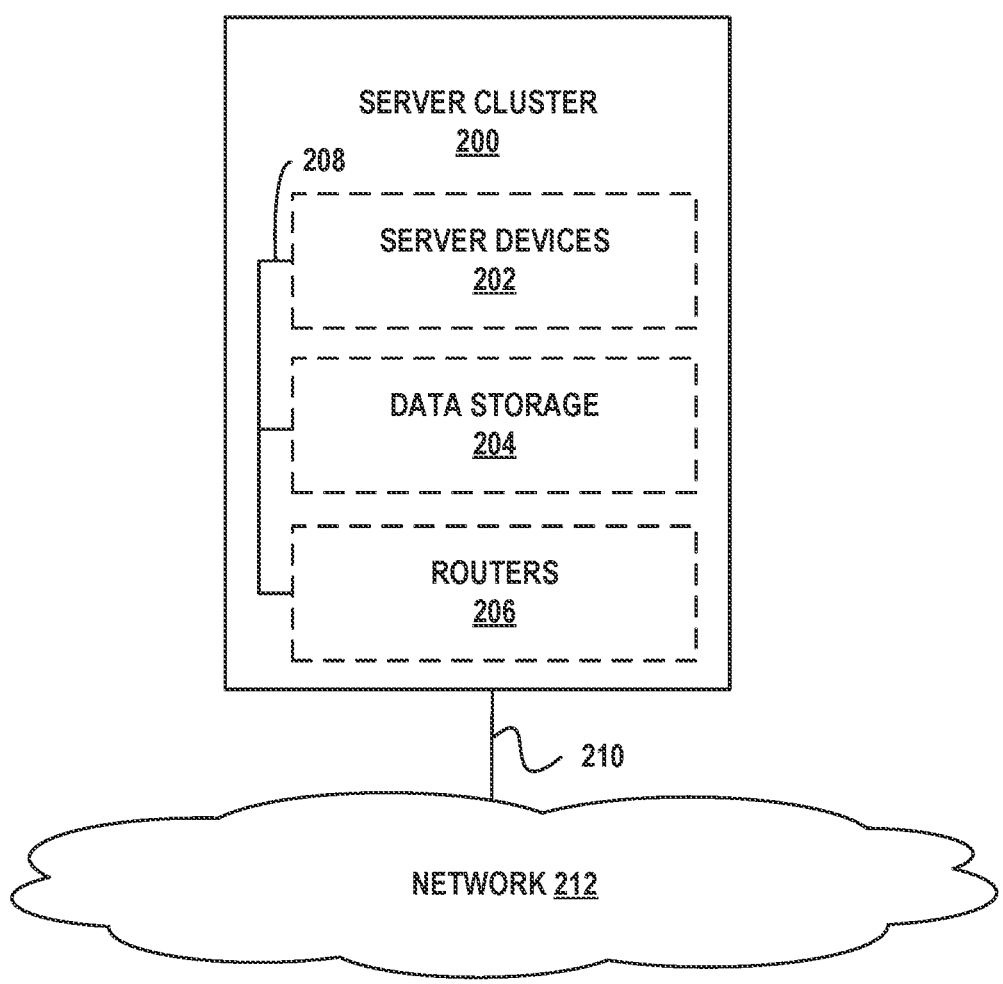
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
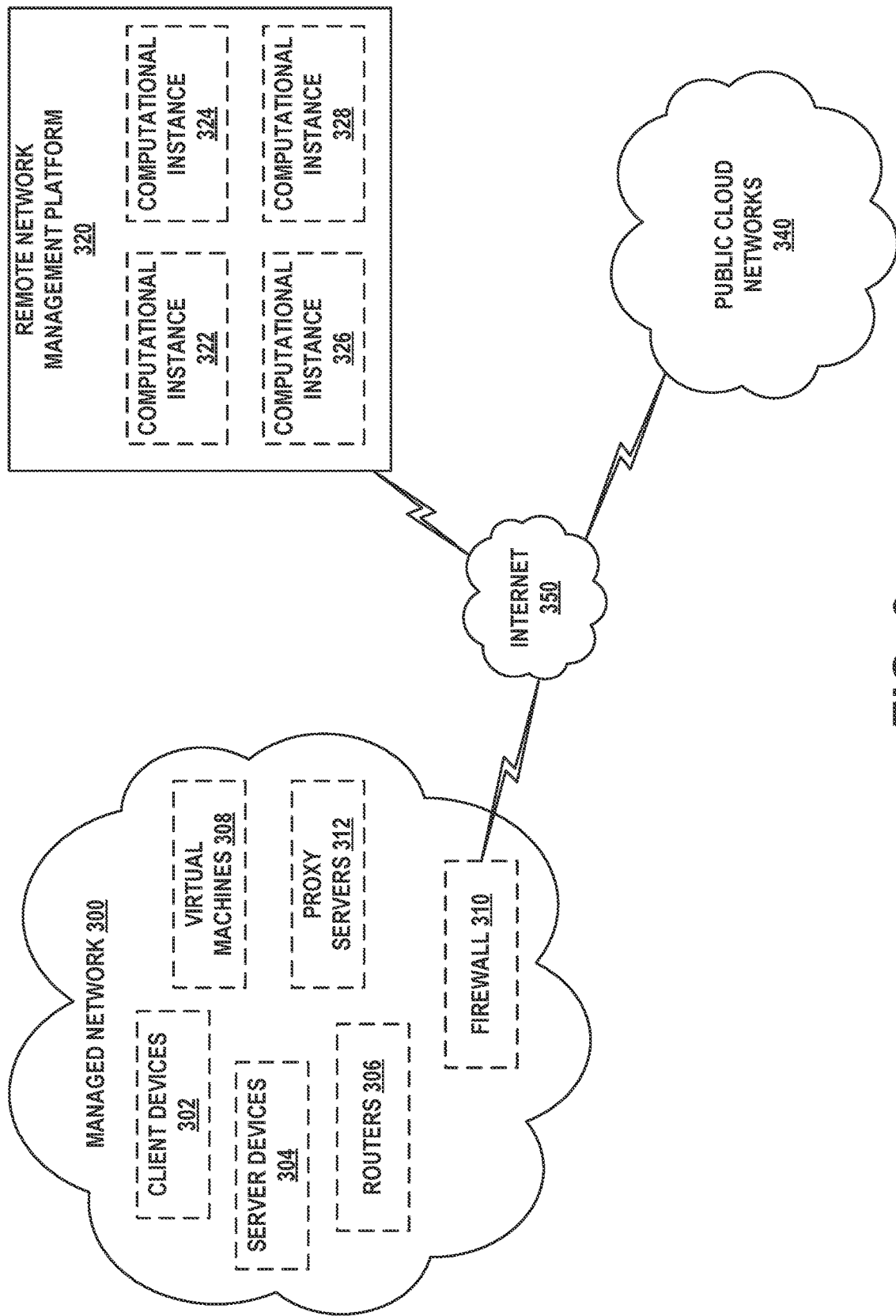
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
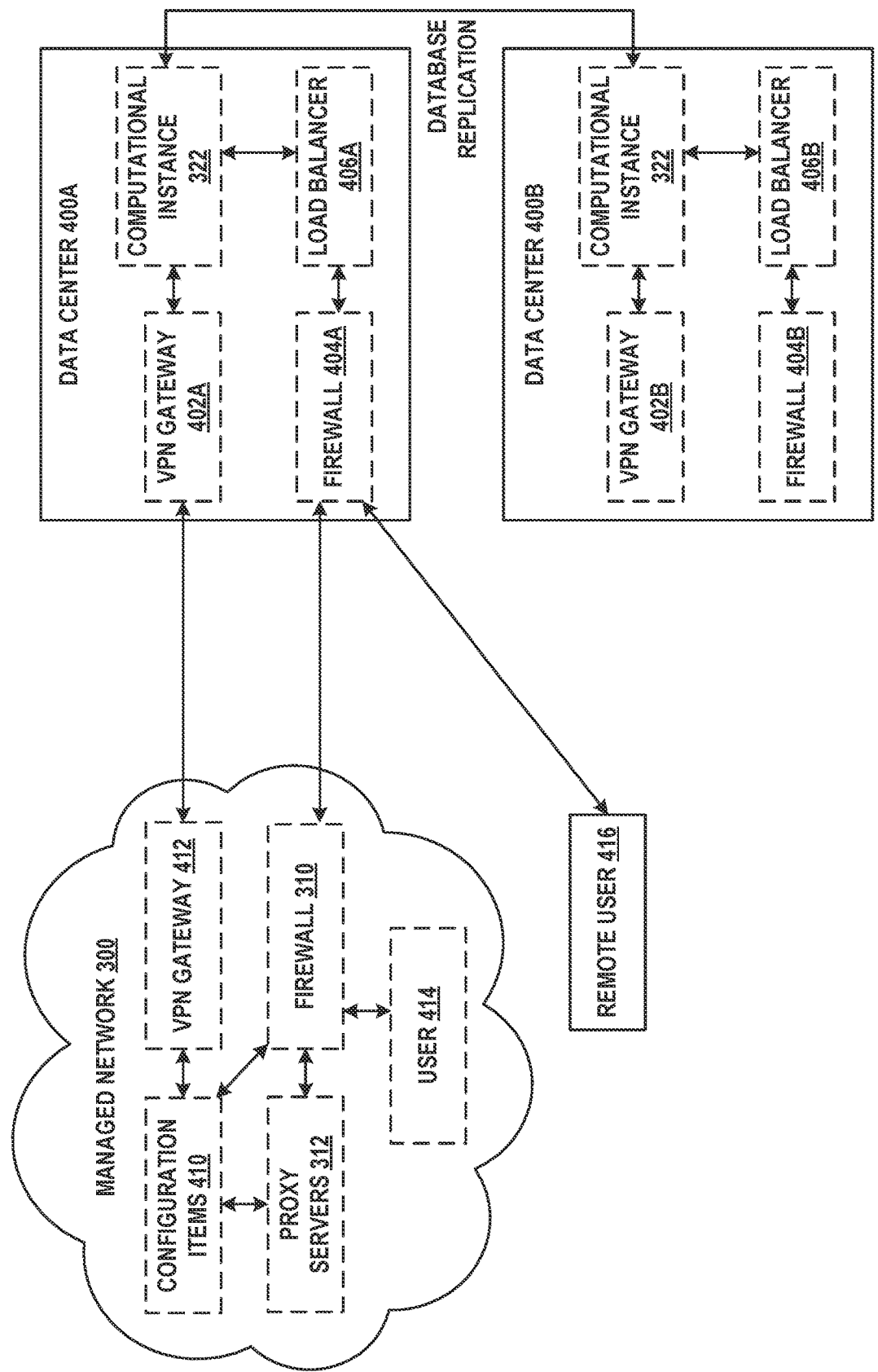
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a CMDB of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
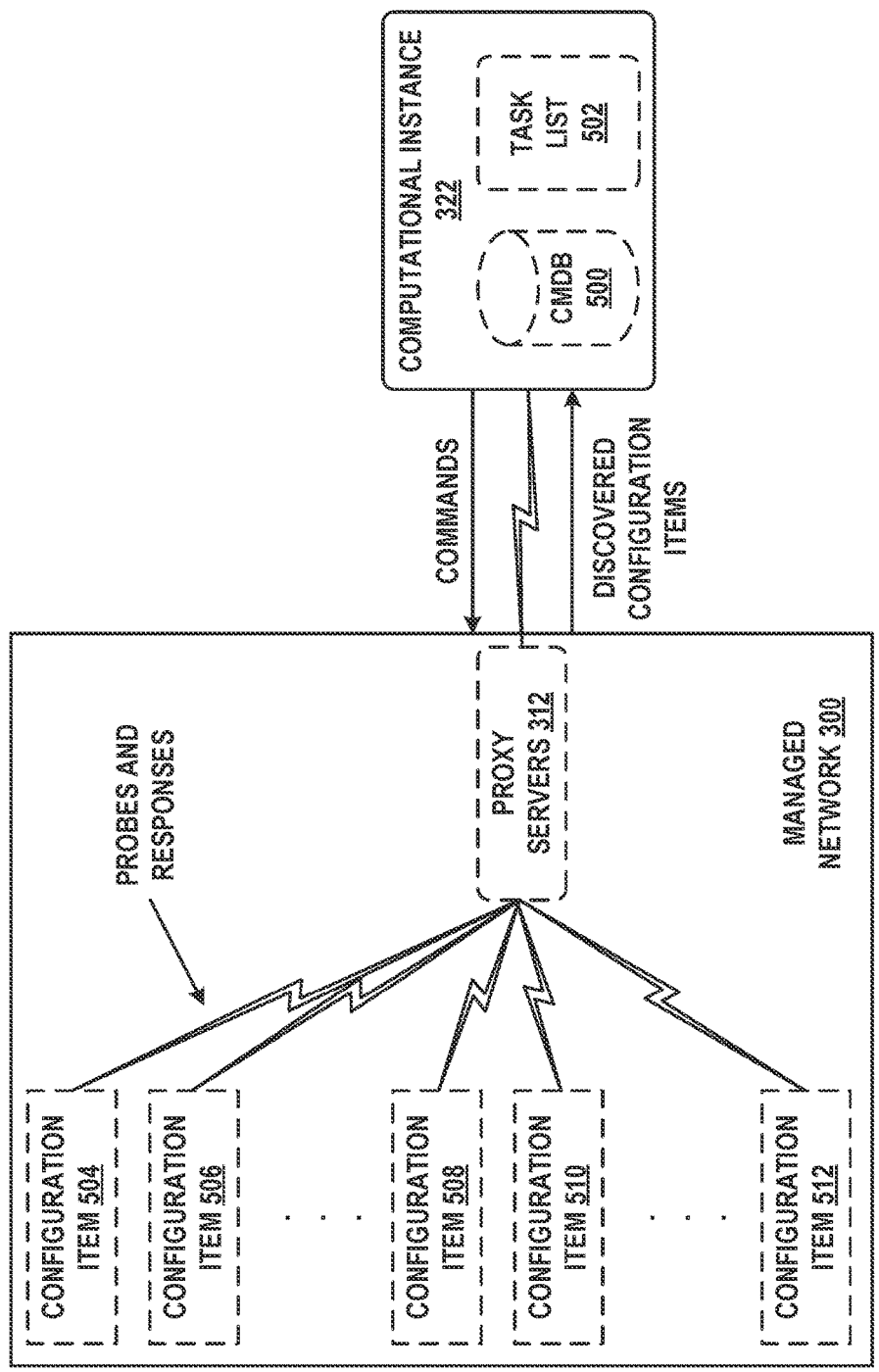
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
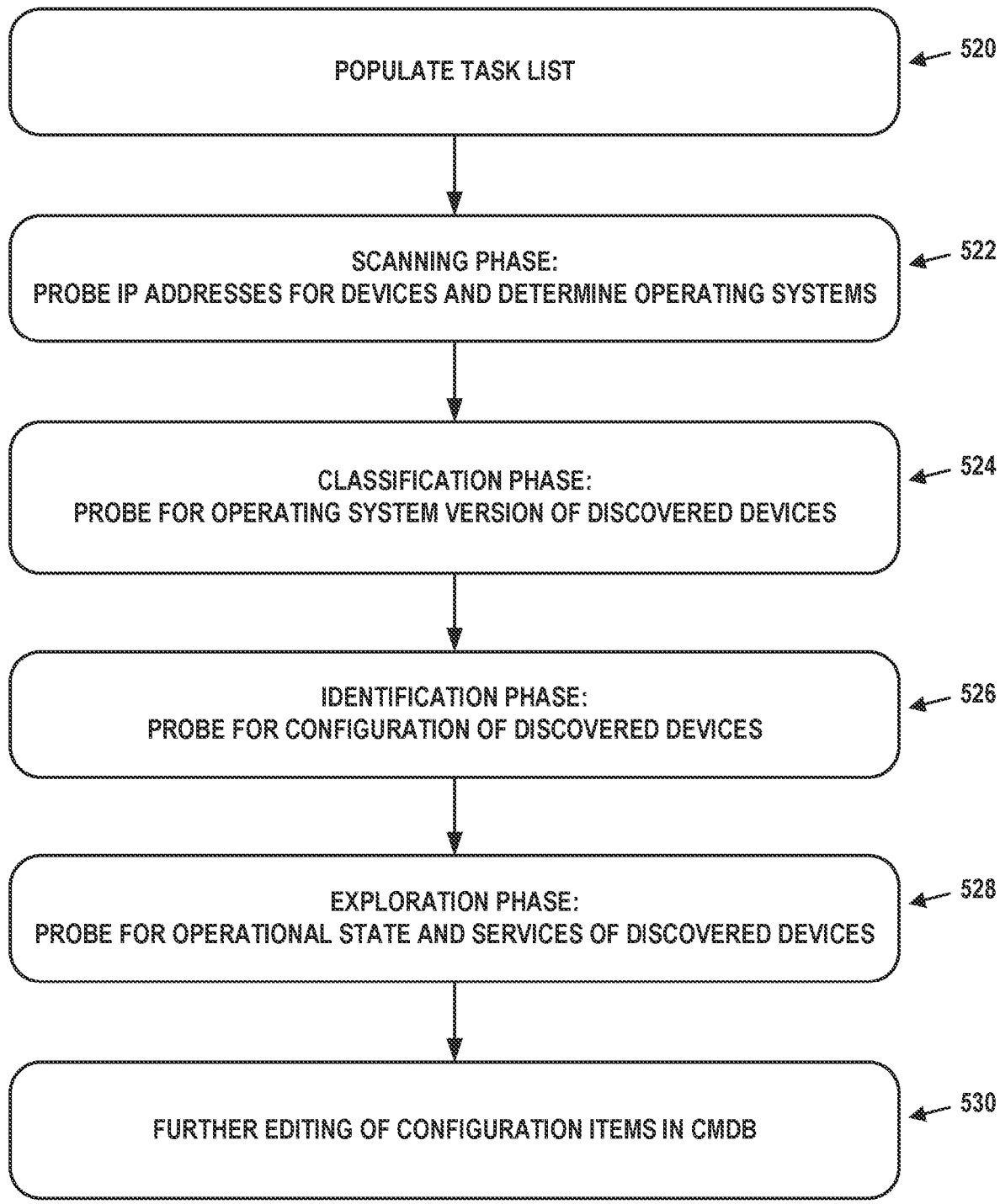
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network.

Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Application for Embedding CI Attribute Values

A third-party scanning system may generate data regarding a computing resource (e.g., physical or virtual computing device, software application, etc.) associated with a managed network. The data may be generated based on the third-party scanning system executing one or more tests (e.g., scans, searches, analyses, checks, assessments, inspections, and/or evaluations) on the computing resource, and may thus be referred to as test result data. It may be beneficial to store at least part of this test result data in association with one or more previously-discovered CIs for the computing resource to provide a more complete record of the computing resource, and to avoid storage of duplicative data.

However, it may be difficult to accurately select the previously-discovered CIs for the computing resource based on the test result data generated by the third-party scanning system. Namely, the test result data generated by the third-party scanning system may use a format, syntax, and/or rules to generate attribute values of the computing resource that differ from the format, syntax, and/or rules used by the discovery process when generating and/or storing the discovered attribute values of the previously-discovered CIs. Thus, rule-based matching algorithms (e.g., string comparison techniques) might not provide a sufficient level of matching accuracy, and/or might not work at all in some cases.

Figure 6A:
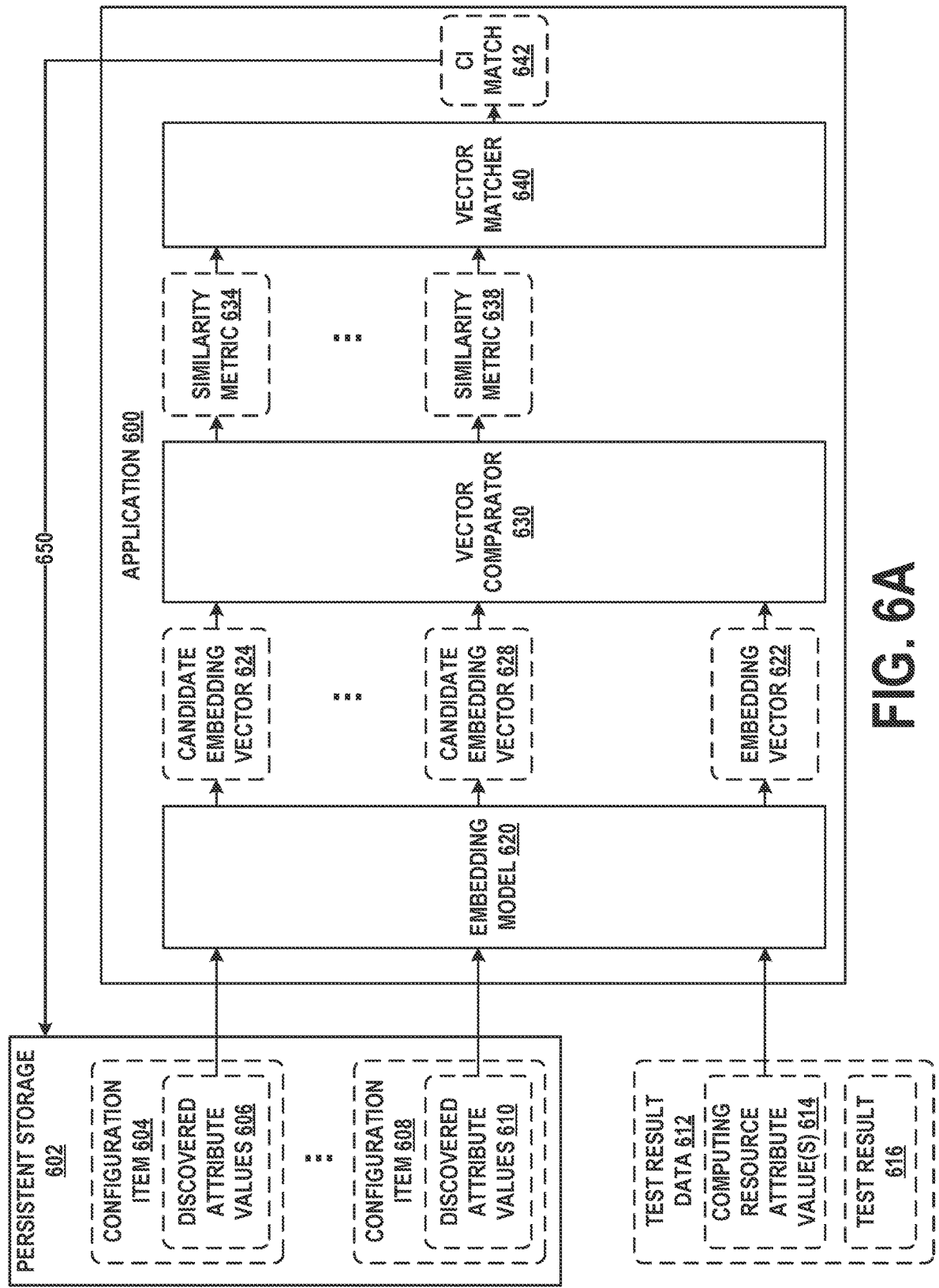
FIG. 6A illustrates components of a software application, in accordance with example embodiments.

Accordingly, FIG. 6A illustrates an example system that may be used to match data generated by a third-party scanning system to a previously-discovered CI. Specifically, persistent storage 602 may store therein records or other representations of CI 604 through CI 608 (i.e., CIs 604-608). For example, CIs 604-608 may be contained and organized in CMDB 500, which may be stored in persistent storage 602. Each of CIs 604-608 may be associated with a corresponding set of discovered attribute values. Namely, CI 604 may be associated with discovered attribute values 606 indicative of various attributes, properties, and/or aspects of CI 604, and CI 608 may be associated with discovered attribute values 610 indicative of various attributes, properties, and/or aspects of CI 604. Discovered attribute values 606-610 may be determined, for example, by a discovery application executing one or more discovery patterns on managed network 300. However, attribute values 606-610 may also be determined by way of other discovery processes and/or applications executed on, for, with respect to, and/or on behalf of managed network 300.

A third-party scanning system may be configured to execute one or more tests of a computing resource associated with managed network 300, and generate test result data 612 based on execution of the one or more tests. As illustrated in and discussed with respect to FIG. 8, the third-party scanning system may be configured to test computing resources within managed network 300 for vulnerabilities, and test result data 612 may thus represent vulnerabilities detected thereby for a particular computing resource. However, the third-party scanning system may additionally or alternatively be configured to test computing resources within managed network 300 for reasons other than vulnerability detection. For example, the third-party scanning system may be configured to scan the computing resources for usage statistics (e.g., processing hardware usage, storage usage, application usage, network usage, etc.) and/or test the performance of the computing resources (e.g., by determining an execution time of benchmark software), among other possible operations.

Regardless of the specific function of the third-party scanning system, test result data 612 may include test result 616 and computing resource attribute value(s) 614. Computing resource attribute value(s) 614 may be indicative of the attributes, properties, and/or aspects of the computing resource tested by the third-party scanning system. Notably, rather than being collected by the discovery application, attribute value(s) 614 may be collected by the third-party scanning system, but may nevertheless represent attributes, properties, and/or aspects of the tested computing resource similar to or the same as those that are collected by the discovery application. Thus, attribute value(s) 614 may constitute information that at least partially identifies the tested computing resource and/or its corresponding CI in persistent storage 602.

In some cases, this tested computing resource may already be discovered and represented by a corresponding CI of CIs 604-608. However, test result 616 may include information that is not yet associated with the corresponding CI of the computing resource. For example, test result 616 might not be associated with the corresponding CI because remote network management platform 320 may rely on the third-party scanning system for generating test result 616, rather than collecting such information during, for example, the discovery process. Thus, it may be desirable to associate test result 616 with the corresponding CI of the tested computing resource (rather than creating an additional, duplicative CI) in order to provide a more complete and accurate record of the tested computing resource. Additionally, storing test result 616 in persistent storage 602 provides a centralized location for most or all information collected regarding the tested computing resource and allows, for example, for viewing of any vulnerabilities of the tested computing resource alongside other attribute values thereof.

In some cases, attribute value(s) 614 may closely or exactly match the discovered attribute values of the CI representing the tested computing resource. For example, character strings representing attribute value(s) 614 may exactly match with one or more character strings representing discovered attribute values 610 of CI 608. Thus, one or more rule-based algorithms may be used to match the tested computing resource to CI 608, and test result 616 may be added to CI 608 on the basis of this match.

In other cases, however, attribute value(s) 614 might not closely or exactly match any of the respective discovered attribute values of CIs 604-608 (although the tested computing resource may nevertheless already be represented by one of CIs 604-608). For example, the third-party scanning system may use a format, syntax, and/or rules when generating attribute value(s) 614 that is different from the format, syntax, and/or rules used (e.g., by the discovery application) when generating and/or storing CIs 604-608. Thus, for example, the character strings representing attribute value(s)

614 may differ from the character strings representing discovered attribute values 610 of CI 608 even when CI 608 represents the tested computing resource. In such cases, when the exact difference in format, syntax, and/or rules is not accounted for by the rule-based algorithms, the one or more rule-based algorithms may fail to match the tested computing resource to a CI.

Accordingly, application 600 may be configured to match test result data 612 to a corresponding CI of CIs 604-608 based on embeddings of the respective attribute values. Thus, application 600 may include embedding model 620, vector comparator 630, and vector matcher 640. Embedding model 620, vector comparator 630, and vector matcher 640 may represent hardware and/or software components, modules, and/or functions of application 600. In some implementations, application 600 may be disposed in and/or executed by a computational instance of remote network management platform 320.

Embedding model 620 may be a machine learning model, such an artificial neural network, configured to generate an embedding vector based on one or more attribute values provided thereto as input. Thus, embedding model 620 may be configured to generate candidate embedding vector 624 based on discovered attribute values 606, candidate embedding vector 628 based on discovered attribute values 610, and embedding vector 622 based on computing resource attribute(s) 614. The structure of the embedding vectors is illustrated in and discussed in more detail with respect to FIG. 6B. Embedding vectors 624-628 may be referred to as candidate embedding vectors because each is a potential match for embedding vector 622.

In some implementations, some or all of the attribute values may be represented as character strings. Thus, embedding model 620 may be a character string embedding model configured to generate embedding vectors based on the character strings. For example, embedding model 620 may include, utilize, and/or implement aspects of Word2Vec, GloVe, fastText, Gensim, or other word embedding architectures. In other implementations, some or all of the attribute values may be represented as integer and/or floating point values, and thus embedding model 620 may be configured to generate embedding vectors based on the integer and/or floating point values. In yet other implementations, a combination of character string, integer, and/or floating point values inputs may be possible, and embedding model 620 may thus include different sub-models configured to process these different data formats.

Vector comparator 630 may be configured to compare embedding vector 622 to each of candidate embedding vectors 624-628 and determine corresponding similarity metrics. Specifically, a comparison of embedding vector 622 with candidate embedding vector 624 may generate similarity metric 634 and a comparison of embedding vector 622 with candidate embedding vector 628 may generate similarity metric 638. In some implementations, the similarity metric may be a Euclidean distance between the embedding vectors being compared. In other implementations, the similarity metric may be a cosine distance between the embedding vectors being compared. Other similarity metrics are possible. Similarity metrics 634-638 may thus measure respective distances between embedding vector 622 and each of candidate embedding vectors 624-628, respectively, in a vector space defined by embedding model 620. These distances may be indicative of how similar attribute value(s) 614 are to each of discovered attribute values 606-610.

Vector matcher 640 may be configured to select, based on similarity metrics 634-638, a CI from CIs 604-608 that best matches the tested computing resource, as indicated by CI match 642. Specifically, vector matcher 640 may select the CI associated with discovered attribute values that most closely match attribute value(s) 614, as measured by way of similarity metrics 634-638 based on embedding vectors 624-628 and 622. In some cases, selection of the CI may be automated. In one example, vector matcher 640 may be configured to select the CI associated with the highest similarity metric of similarity metrics 634-638. In another example, the CI may be additionally or alternatively selected based on its corresponding similarity metric exceeding a threshold similarity value, such as 75%, 80%, 90%, or another desired threshold value (which may also be expressed as a corresponding distance rather than a percentage). Thus, in some cases, vector matcher 640 may determine that a match for embedding vector 622 does not exist based on, for example, each of similarity metrics 634-638 failing to exceed the threshold similarity value.

In a further example, vector matcher 640 and/or other components of application 600 may be configured to display some of similarity metrics 634-638 by way of a user interface to allow for manual CI matching. For example, the n highest similarity metrics of similarity metrics 634-638 may be displayed, where n is an integer value such as 3, 4, 5, 8, etc., and may be modifiable. In some cases, the user interface may also display attribute value(s) 614 and the discovered attribute values of the CIs corresponding to the n highest similarity metrics. A user may be able to select one of the CIs associated with the n highest similarity metrics based on the displayed information, thereby indicating the best CI match for the tested computing resource. In some cases, the user may additionally or alternatively indicate that none of CIs 604-608 represents the discovered computing resource, and a new CI is to be generated therefor. Thus, selection of the CI may be manual, but may be assisted by the information generated and displayed by application 600.

CI match 642 may indicate the selected CI that most likely corresponds to the tested computing resource, or an absence of a successful match. An indication of CI match 642 may be provided to persistent storage 602, as indicated by line 650, thereby causing persistent storage 602 to store at least test result 616 in association with the selected CI (or a new CI in the absence of a successful match). For example, when CI match 642 indicates that CI 608 most likely corresponds to the tested computing resource, persistent storage 602 may store test result 616 as part of discovered attribute values 610.

VI. Example Embedding Vector Structure

FIG. 6B illustrates an example relationship between a set of attribute values and dimensions of its corresponding embedding vector, such as between attribute value(s) 614 and dimensions of embedding vector 622. The third-party scanning system may define the set of attributes, properties, and/or aspects of the tested computing resource that attribute value(s) 614 represent. Thus, this the set of attributes, properties, and/or aspects of the tested computing resource may vary with different third-party scanning systems. In one example, the set of attributes, properties, and/or aspects of the tested computing resource may include third-party scanning system identifier 660, Network Basic Input/Output System (NetBIOS) identifier 662, computing resource name 664, fully qualified domain name (FQDN) 666, IP address 668, and/or DNS entry 670.

Third-party scanning system identifier 660 may be an identifier assigned to the tested computing resource by the third-party scanning system. NetBIOS identifier 662 may be an identifier assigned to the tested computing resource by NetBIOS. Computing resource name 664 may be a name associated with the tested computing resource, such as a hostname or a software application name, among other possibilities. FQDN 666 may represent at least a portion of a FQDN associated with the tested computing resource. IP address 668 may represent one or more of an IP address associated with the tested computing resource, and/or an IP address associated with another related computing resource (e.g., network adapter). DNS entry 670 may represent DNS information associated with the tested computing resource or another related computing resource.

In some cases, the set of computing resource attributes, properties, and/or aspects represented by discovered attribute values 606-610 may be larger than that represented by attribute value(s) 614. That is, discovered attributes 606-610 may include attribute values that the third-party scanning system does not collect. Accordingly, embedding model 620 may be configured to consider the attributes, properties, and/or aspects represented by attribute value(s) 614, and ignore the attributes, properties, and/or aspects that are not represented by attribute value(s) 614 (but that might be represented by discovered attribute values 606-610). Specifically, the attributes, properties, and/or aspects that are not represented by attribute value(s) 614 may be ignored since they are not usable for comparison.

Embedding vector may be an N-dimensional vector, and may thus include embedding values $D_1, D_2, D_3, D_4, D_5, D_6, D_7,$ and $D_8$ through $D_N$ (i.e., $D_1$-$D_N$). Embedding model 620 may be configured to map each of attribute value(s) 614 to one or more corresponding dimensions of embedding vector 622. In some cases, each of attribute value(s) 614 may be mapped to the one or more corresponding dimensions of embedding vector 622 exclusively of other attribute values. For example, third-party system identifier may be mapped to $D_1$, NetBIOS identifier 662 may be mapped to $D_2$ and $D_3$, computing resource name 664 may be mapped to $D_4$, FQDN 666 may be mapped to $D_5, D_6,$ and $D_7$, IP address 668 may be mapped to $D_8$, and DNS entry 670 may be mapped to $D_N$. Thus, $D_1$ may represent third-party scanning system identifier 660, but might not represent any other attributes of attribute value(s) 614. Similarly, $D_5, D_6,$ and $D_7$ may represent FQDN 666, but might not represent any other attributes of attribute value(s) 614, and so on.

In some cases, the number of dimensions of embedding vector 622 assigned and/or dedicated to a particular attribute of attribute value(s) 614 may be used to define a relative weight or importance of the particular attribute. Specifically, a relative weight or importance of the particular attribute may be increased by increasing the number of dimensions assigned to the particular attribute (e.g., from 2 to 3), or decreased by decreasing the number of dimensions assigned to the particular attribute (e.g., from 2 to 1). Increasing the number of dimensions used to represent the particular attribute allows embedding vector 622 to store additional information regarding the particular attribute and thus more completely and/or accurately represent the particular attribute. In one example, attribute values that are expected to remain constant over time (e.g., computing resource name 664 representing, for example, a media access control (MAC) address) may be assigned a higher weight or importance, and thus more dimensions of embedding vector 622, than attribute values expected to change over time (e.g., IP address 668). In another example, longer attribute values (e.g., as measured by an expected number of characters) may be assigned more dimensions of embedding vector 622 than shorter attribute values. In some implementations, the relative weighing between attribute value(s) 614 may be based on other factors.

Accordingly, embedding model 620 may include a plurality of sub-models, each configured to generate the embedding values for a corresponding one or more of attribute value(s) 614. The outputs of the plurality of sub-models may be combined to form embedding vector 622. Notably, while FIG. 6B illustrates attribute value(s) 614 and embedding vector 622, the discussion thereof is equally applicable to discovered attribute values 606-608 and candidate embedding vectors 624-628.

Structuring embedding model 620 and the embedding vectors in this manner allows application 600 to account for missing attribute values. Namely, the third-party scanning system might not always collect and/or provide each of attribute value(s) 614. That is, one or more of third-party scanning system identifier 660, NetBIOS identifier 662, computing resource name 664, FQDN 666, IP address 668, and/or DNS entry 670 may be missing from attribute value(s) 614, depending, for example, on the computing resource undergoing testing and/or the specific third-party scanning system executing the testing. Similarly, discovered attribute values 606-610 may additionally or alternatively be missing values for one or more of these attributes.

Thus, when a particular attribute value is missing, vector comparator 630 may ignore the corresponding dimensions of embedding vector 622 and candidate embedding vectors 624-628 when computing similarity metrics 634-638. For example, when a value for computing resource name 664 is missing, $D_4$ may be ignored. In some implementations, embedding vector 622 and candidate embedding vectors 624-628 may be modified to remove therefrom any dimensions corresponding to missing attribute values, resulting in updated embedding vectors having a smaller dimension than the original embedding vector (e.g., embedding vector 622 and candidate embedding vectors 624-628 with $D_4$ removed). Vector comparator may then compare the updated embedding vectors when calculating similarity metrics 634-638.

If the mapping between attribute values and embedding vector dimensions were not fixed and/or predefined, entries of the embedding vector might not be selectively ignorable/removable. Thus, similarity metrics 634-638 might treat the absence of an attribute value as a valid value (e.g., a zero or null value), resulting in erroneous similarity metrics. For example, if aspects of FQDN 666 were represented by each of $D_1$-$D_N$ and a value for FQDN 666 was missing, ignoring the entirety of embedding vector 622 would not be possible. Similarly, if aspects of NetBIOS identifier 662 and IP address 668 were collectively represented by $D_2, D_4,$ and $D_8$, and the value of IP address 668 was missing, ignoring any one of $D_2, D_4,$ and $D_8$ might result in ignoring useful information about NetBIOS identifier 662, and vice versa.

Graph 680 illustrates graphical representation 682 of the values of embedding vector 622 along dimensions $D_2$ and $D_3$. The other dimensions of embedding vector 622 may be similarly graphed in two or three dimensions to visually illustrate at least portions of embedding vector 622. Embedding model 620 may be trained to generate embedding vectors such that semantically similar attribute values are separated from one another by no more than a threshold distance in the vector space defined by embedding model 620. Thus, a first NetBIOS identifier value may correspond to graphical representation 682 of the corresponding dimensions of embedding vector 622, and a second semantically similar NetBIOS identifier value may cause embedding model 620 to generate values for the $D_2$ and $D_3$ dimensions that, when graphed in graph 680, land within threshold distance 684 of graphical representation 682. Thus, embedding model 620 may preserve the semantic similarity between attributes when transforming these attributes into the vector space.

In implementations where portions of discovered attribute values 606-610 and/or attribute values 614 are representing by character strings (e.g., words, phrases, and/or parts of words), embedding vector 622 may be viewed or referred to as a word vector. A word vector may be determined for each word present in a corpus of text records (e.g., discovered attribute values 606-610) such that words (e.g., attribute values) having similar meanings (or "semantic content") are associated with word vectors that are near each other within a semantically encoded vector space (e.g., the vector space defined by $D_1$-$D_N$). Such vectors may have tens, hundreds, or more elements and thus may define an N-space where N is a number of dimensions. These word vectors allow the underlying meaning of words to be compared or otherwise operated on by a computing device. Accordingly, the use of word vectors may allow for a significant improvement over simpler word list or word matrix methods.

Word vectors can be used to quickly and efficiently compare the overall semantic content of samples of text (e.g., one or more attribute values), allowing a similarity metric between the samples of text to be determined. This can include determining a Euclidean distance, a cosine similarity, a sum of squared distances over each of the N dimensions, or some other measure of similarity between the word vectors of the words in each of the text samples. In some implementations, the word vectors may be provided as input to an artificial neural network, a support vector machine, a decision tree, or some other machine learning algorithm in order to perform sentiment analysis, to classify or cluster samples of text, to determine a level of similarity between samples of text, or to perform some other word/attribute processing task.

Word vectors may be determined for a set of words in a variety of ways. In an example, a matrix of the word vectors can be an input layer of an artificial neural network. The artificial neural network (including the matrix of word vectors) can then be trained with a large number of character strings from a database to determine the contextual relationships between words (e.g., attribute values) appearing in these character strings.

Algebraic vector operations can be used on word vectors. Thus, subtracting the vector representation of "mail" from the vector representation of "email" is expected to produce a vector with a magnitude close to 0. However, subtracting the vector representation of "VPN" from the vector representation of "email" is expected to produce a vector with higher magnitudes. In this manner, the model indicates that "email" and "mail" have closer meanings than "email" and "VPN". Thus, after training, words with similar meanings can map to a similar position in the vector space. For example, the vectors for "powerful" and "strong" may appear close to each other, whereas the vectors for "gerbil" and "hypotenuse" may be farther apart. Additions and subtractions between word vectors can also carry meaning. Using vector algebra on the determined word vectors, analogy questions, such as "King"−"man"+"woman"="Queen", can be answered.

In general, the closer that the vector difference between two word vectors is to 0, the greater the similarity (e.g., similarity metrics 634-638) of the words they represent. Such a comparison may identify one or more character string vectors from databases or another source that "match" in this fashion. In some cases, this may be the character string vectors with the highest similarity, or any text string vector with a similarity that is greater than a pre-determined value.

VII. Example Embedding Model Training and Usage

Figure 7A:
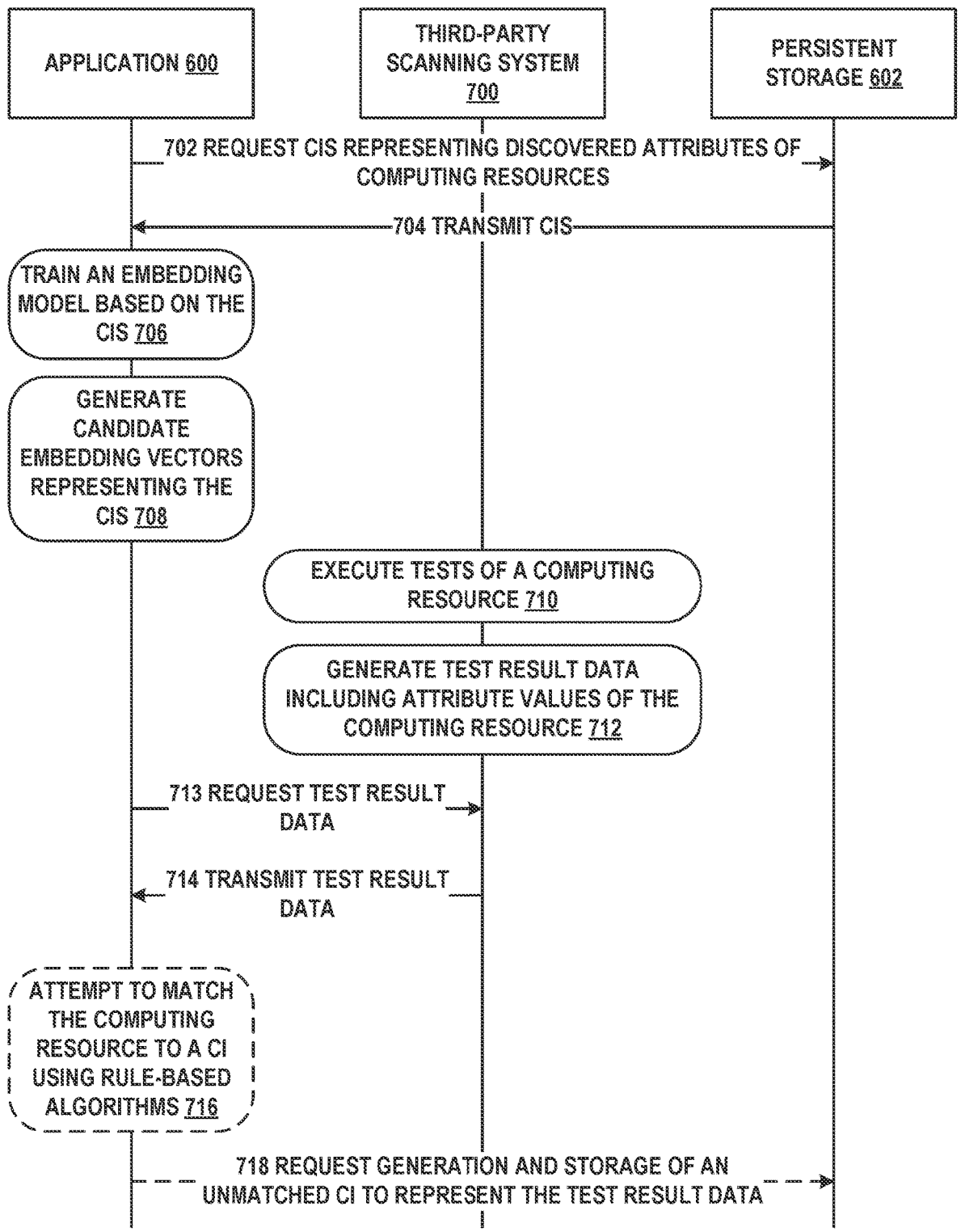
FIGS. 7A and 7B illustrate a message flow diagram, in accordance with example embodiments.
Figure 7B:
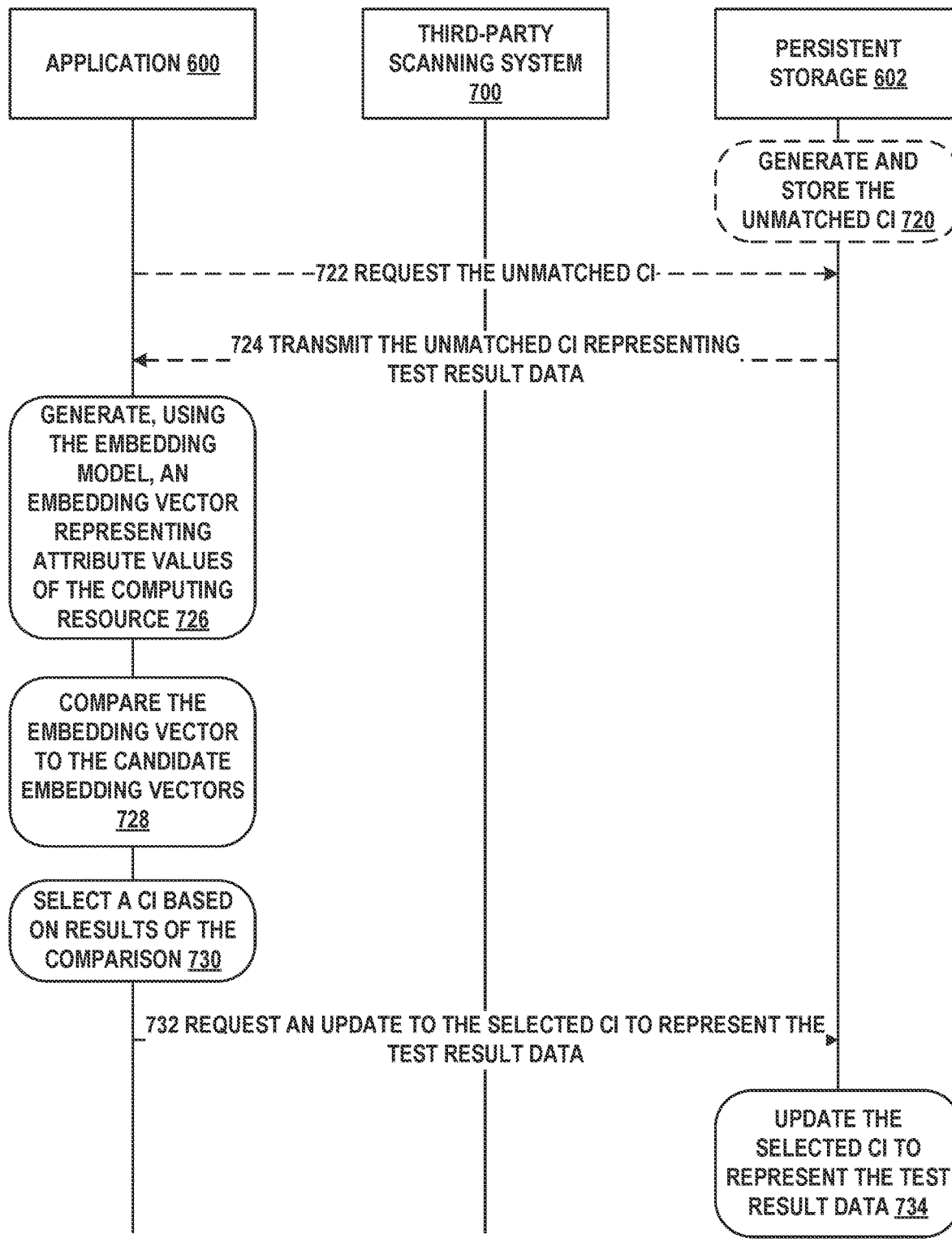

FIGS. 7A and 7B illustrate a message flow diagram of example training and usage of aspects of application 600. Specifically, in order to train embedding model 620, application 600 may be configured to transmit, to persistent storage 602, a request for CIs representing discovered attributes of computing resources, as illustrated by arrow 702. Based on or in response to receipt of the request at arrow 702, persistent storage 602 may be configured to transmit, to application 600, the requested CIs, as illustrated by arrow 704. The transmitted CIs may define the training data set for embedding model 620. Specifically, the subset of the discovered attribute values of these CIs that is also expected to be found in the test result data provided by the third-party scanning system may define the training data.

Based on or in response to receipt of the CIs by application 600 at arrow 704, application 600 may be configured to train the embedding model based on the discovered attribute values represented in the CIs, as indicated by block 706. In one example, the ground-truth data used for training may be provided by the relationships between the CIs, which may be indicated as part of the discovered attribute values of the CIs. That is, each CI may be related to one or more other CIs through various types of relationships. These types of relationships may include, for example, a first CI being a parent of a second CI, the first CI using the second CI, the first CI being hosted on the second CI, and so on. These relationships may form/define a map and/or hierarchy that illustrates how each CI relates to other CIs. In some cases, the map and/or hierarchy may include all of the discovered CIs of managed network 300.

Thus, the map and/or hierarchy, as well as the types of relationships illustrated therein, may be indicative of how similar the CIs are to one another. For example, two CIs that have a direct relationship may be considered more similar than two CIs linked together by way of a third CI therebetween. Similarly, some types of relationships between CIs (e.g., two CIs being part of the same cluster) may be indicative of greater similarity between these CIs than other types of relationships between these CIs (e.g., the first CI using the second CI).

Embedding model 620 may be trained to generate embedding vectors that approximate the relationships indicated by the map and/or hierarchy. That is, embedding model 620 may preserve the semantic information and structure of the map/hierarchy when generating embedding vectors. Accordingly, CIs that are close to one another in the map and/or hierarchy may be associated with embedding vectors that are close to one another in vector space. In some implementations, the training of embedding model 620 may be structured according to the continuous bag of words (CBOW) model, where embedding model 620 is configured to predict one or more discovered attribute values of a particular CI based on the discovered attribute values of CIs related to the particular CI. In other implementations, the training of embedding model 620 may be structured according to the skip-gram model, where embedding model 620 is configured to predict the discovered attribute values of CIs related to the particular CI based on one or more discovered attribute values of the particular CI.

Thus, much like a natural language word embedding model may be trained based on the context that a given word is used in (e.g., in a sentence or paragraph), embedding model 620 may be trained based on the context in which a given CI is found within the map/hierarchy. In other examples, the ground-truth data used for training of embedding model 620 may be different, may be structured differently, and/or the training may define similarity between CIs in other ways.

Based on or in response to training of the embedding model at block 706, application 600 may be configured to generate candidate embedding vectors representing the CIs transmitted at arrow 704, as indicated by block 708. That is, application 600 may use the trained embedding model to embed the discovered attribute values of each CI in vector space. These candidate embeddings may be saved and used at a later time for comparison to embedding vectors generated to represent the attribute values of computing resources tested by third-party scanning system 700. Thus, the candidate embedding vectors might not be recomputed each time a new embedding vector is generated for a tested computing resource.

As the CIs stored in persistent storage 602 are updated over time, embedding model 620 may be retrained to reflect the changes to the CIs and the discovered attribute values thereof. In one example, embedding model 620 may be retrained based on or in response to at least a threshold number of CIs being added, updated, and/or modified. In another example, embedding model 620 may be retrained periodically (e.g., every hour, day, week, or month). Retraining embedding model 620 allows the model to remain accurate and up-to-date with respect to changing CIs.

Notably, in some implementations, each respective managed network may be associated with a corresponding embedding model that is trained on the CIs specific to the respective managed network. By training on the CIs of a particular managed network, the embedding model may more accurately embed attribute values (e.g., as measured by preservation of semantic information) associated with computing resources in the particular managed network. Stated another way, since different managed networks may include different CIs arranged in different ways and having different discovered attribute values, a single shared embedding model trained on CIs sourced from these different managed networks might not be as accurate as a network-specific embedding model. For example, a given computing resource may be used in different ways and/or placed in different contexts depending on the particular managed network. A network-specific embedding model may account for the particular arrangement of computing resources of the corresponding managed network, and thus generate more accurate embeddings for the corresponding managed network than a more general embedding model.

Third-party scanning system 700 may be configured to execute tests of a computing resource within managed network 300, as indicated by block 710. For example, the tests may be executed periodically, in response to occurrence of a predetermined trigger event, or in response to a request from one or more users, among other possibilities. Based on or in response to execution of the tests at block 710, third-party scanning system 700 may be configured to generate test result data (e.g., test result data 612) which includes attribute values of the tested computing resource, as indicated by block 712. Application 600 may be configured to transmit, to third-party scanning system 700, a request for the test result data, as indicated by arrow 713. In some implementations, the request at arrow 713 may be transmitted based on or in response to third-party scanning system 700 informing application 600 and/or another component of remote network management platform 320 that the test result data is available. Based on or in response to reception of the request at block 713, third-party scanning system 700 may be configured to transmit the test result data to application 600, as indicated by arrow 714.

In some implementations, based on or in response to reception of test result data at arrow 714, application 600 may be configured to attempt to match the tested computing resource to a CI found in persistent storage 602 using one or more rule-based algorithms, as indicated by block 716. The rule-based algorithms may include, for example, algorithms configured to compare character strings representing the attribute values of the tested computing resource and character strings representing the discovered attribute values of one or more CIs. Other rule-based algorithms are possible. In some cases, the rule-based algorithms may accurately match the tested computing resource to a correspond CI, and use of embedding model 620 thus might not be necessary. Embedding model 620 may nevertheless be used to verify the match determined by the rule-based algorithms.

In other cases, the rule-based algorithms might be unable to accurately match the tested computing resource to a correspond CI. Based on or in response to the rule-based algorithms failing to find an accurate match, application 600 may be configured to request generation and storage of an unmatched CI to represent the test result data, as indicated by arrow 718. The unmatched CI may store a representation of test result data 612, including attribute value(s) 614 and test result 616. Turning to FIG. 7B, based on or in response to reception of the request at arrow 718, persistent storage 602 may be configured to generate and store the unmatched CI, as indicated by block 720. When persistent storage 602 already includes a CI corresponding to the tested computing resource, the unmatched CI may be duplicative, and it may thus be desirable to combine the unmatched CI with the CI already in persistent storage 602.

The unmatched CI may be stored so that it may be retrieved later and either manually or automatically matched to another CI in persistent storage 602. Accordingly, application 600 may be configured to transmit, to persistent storage 602, a request for the unmatched CI, as indicated by arrow 722. Based on or in response to reception of the request at arrow 722, persistent storage 602 may be configured to transmit, to application 600, the unmatched CI representing the test result data, as indicated by arrow 724.

In one example, a user may use application 600 to retrieve the unmatched CIs and manually match the unmatched CIs to corresponding CIs stored in persistent storage 602 based on manual review of the attribute values thereof. In another example, the user's review and matching of the CIs may be assisted by output of application 600. In a further example, embedding model 620 may be used to batch the processing of a plurality of unmatched CIs, and application 600 may match the unmatched CIs to other CIs automatically, without user input. In a yet further example, embedding model 620 may be used to process the test result data generated by third-party scanning system without generation and storage of unmatched CIs. Thus, in such implementations, the operations of arrow 718 through arrow 724 may be omitted (as indicated by the dashed line pattern). In an additional example, application 600 may be used to match the tested computing resource to a CI without also using the rule-based algorithms, thus allowing for the operations of block 716 to be omitted (as indicated by the dashed line pattern).

Based on or in response to reception of the test result data at arrow 714 or arrow 724, application 600 may be configured to generate, using the embedding model, an embedding vector representing the attribute values of the computing resource tested by third-party scanning system 700, as indicated by block 726. Based on or in response to generation of the embedding vector at block 726, application 600 may be configured to compare the embedding vector to the candidate embedding vectors generated at block 708, as indicated by block 728. Based on or in response to results of the comparison at block 728, application 600 may be configured to select a CI that most likely matches the tested computing resource, as indicated by block 730. In cases where the comparison at block 728 indicates that a matching CI has not been identified with sufficient confidence (e.g., when tested computing resource is not yet represented by any of the vectors generated at block 708), a new CI may be generated to represent the tested computing resource.

Based on or in response to selection of the CI, application 600 may be configured to transmit, to persistent storage 602, a request for an update to the selected CI, as indicated by arrow 732. The requested update may indicate to incorporate at least part of the test result data into the CI, to thereby record the test result data as part of the CI. Based on or in response to reception of the request at arrow 732, persistent storage 602 may be configured to update the selected CI to represent the test result data, as indicated by block 734. In cases where the CI is updated based on data from an unmatched CI, the unmatched CI may be deleted based on or in response to updating the CI at block 734. In cases where no matching CI is identified, a new CI may be generated and stored to represent the tested computing resource instead of updating an existing CI. Additional details of the operations of block 726 through block 734 are discussed in with respect to FIGS. 6A and 6B.

Notably, in some cases, the attribute values of the tested CI might not exactly match the discovered attribute values of the CIs stored in persistent storage 602. Accordingly, the input of embedding model 620 may be structured to allow for inputs that have not been previously observed as part of the training data set. In some implementations, the attribute values may be represented as character strings, and each previously-seen character string may be mapped to a corresponding real value (e.g., represented as an input vector) that is provided as input to embedding model 620. Embedding model 620 may be configured to map this real value to an embedding vector.

Thus, application 600 and/or embedding model 620 may allow for encoding of previously-unseen character strings as combinations of previously-seen n-grams. Each n-gram may map (e.g., using a hash function) to a corresponding real value. Thus, for example, previously-unseen computing resource name "WinServ100" may be represented as a combination of (i) the trigram (i.e., 3-gram) "Win," (ii) the 4-gram "Serv," and (iii) the trigram "100," each of which may have been previously seen in the training data set. Accordingly, the real value representing "WinServ100" may be a function (e.g., a weighted sum) of the real values assigned to represent "Win," "Serv," and "100." Alternatively, previously-unseen computing resource name "WinServ100" may be represented as a combination of (i) the 7-gram "WinServ" and (ii) the trigram "100." Yet another possibility involves representing "WinServ100" as a combination of its individual characters. Other combinations of n-grams are possible. To support such previously-unseen words, embedding model 620 may be trained by breaking down each character string of the training data into combinations of n-grams.

VIII. Example Vulnerability Management Architecture

Figure 8:
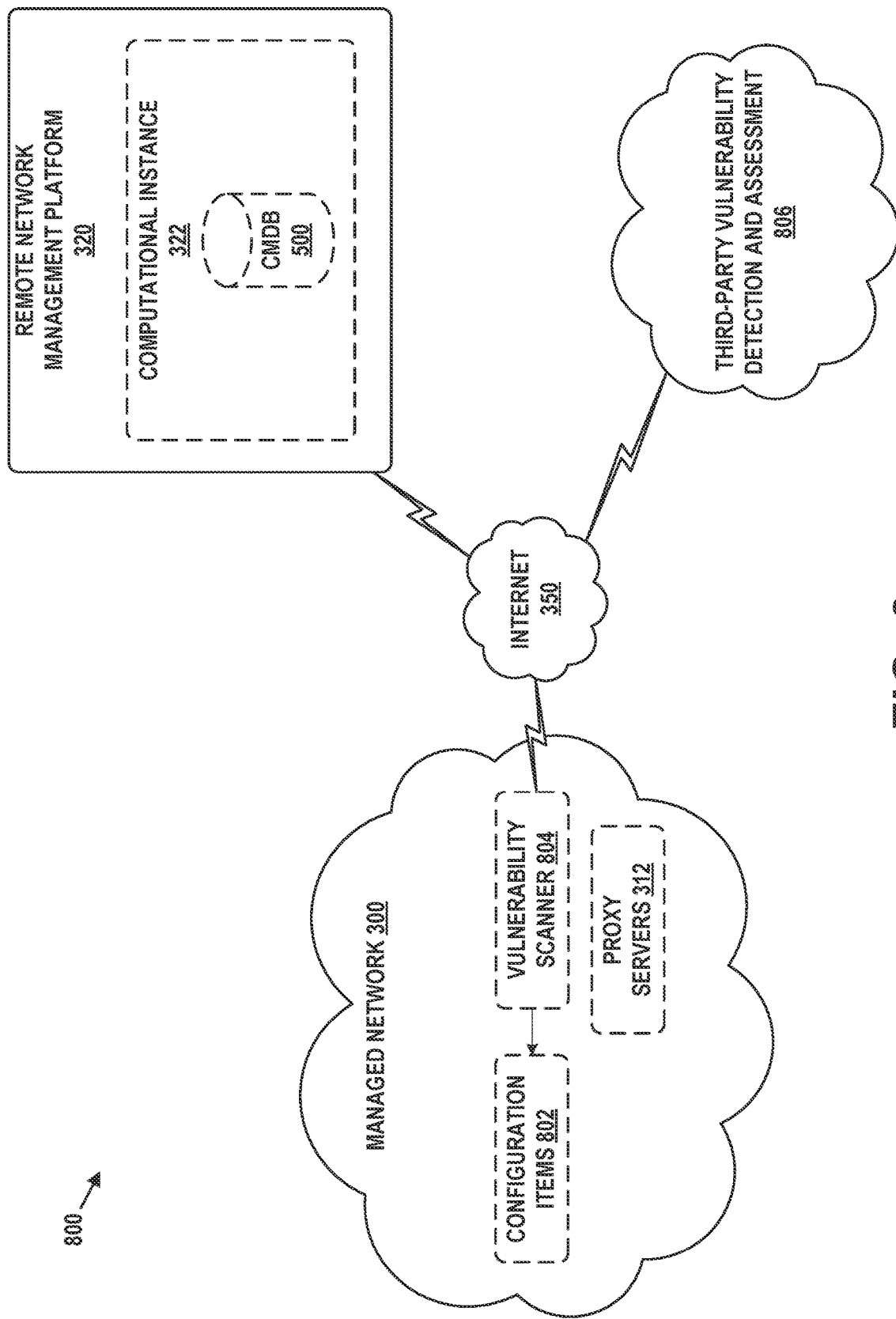
FIG. 8 illustrates a vulnerability management architecture, in accordance with example embodiments.

FIG. 8 depicts vulnerability management architecture 800. Architecture 800 includes managed network 300, remote network management platform 320, and third-party vulnerability detection and assessment cloud 806 (referred to as cloud 806 for short), all connected by Internet 350.

Managed network 300 is largely the same as shown in FIG. 3, but just showing configuration items 802, vulnerability scanner 804, and proxy server(s) 312. Each of configuration items 802 may represent a virtual or physical computing device and/or a software application installed upon such a computing device. Configuration items 802 may correspond to configuration items 604-608 of FIG. 6A. Vulnerability scanner 804 may be a dedicated unit of software and/or a virtual or physical computing device that is deployed within managed network 300 to detect vulnerabilities relating to configuration items 802. Proxy server(s) 312 may take on the same or similar functionality as described above.

In some embodiments, vulnerability scanner 804 may include a software agent that is deployed on multiple endpoints, where each endpoint is represented as one or more of configuration items 802. In these or other embodiments, vulnerability scanner 804 may include one or more software applications deployed on one or more dedicated computing devices. In either situation, vulnerability scanner 804 may scan or otherwise remotely access configuration items 802 to detect vulnerabilities. For example, vulnerability scanner 804 may scan configuration items 802—e.g., probe for open TCP/IP ports on computing devices, and/or log on to computing devices to determine the operating system, software applications installed thereon, and versions thereof. In some embodiments, vulnerability scanner 804 may store the results of these scans locally, or may transmit the results to cloud 806.

Cloud 806 and/or vulnerability scanner 804 provide an example of third-party scanning system 700. However, third-party scanning system 700 may also represent other types of systems that interact with managed network 300. Specifically, cloud 806 and/or vulnerability scanner 804 represent software tools configured to perform automated vulnerability detection. Some of these tools include, but are not limited to, NESSUS®, QUALYSGUARD®, and RAPID7®. For purposes of simplicity, various vulnerability detection and assessment tools are referred to herein as third-party vulnerability tools.

The vulnerabilities detected by the third-party vulnerability tools may relate to known defects in hardware, operating systems, and/or software packages deployed throughout a managed network. Exploitation of a vulnerability may result in a negative impact to the data confidentiality, integrity, and/or availability of one or more computing devices. Such vulnerabilities may be associated with different severities. It should be noted that vulnerabilities are not the same as active security threats. Vulnerabilities indicate that a problem has been identified independent of whether the vulnerability has been actually exploited. Active security threats, on the other hand, are ongoing exploitations that often require immediate attention.

Remote network management platform 320 is the same or similar to that of FIG. 3, but showing only one computational instance, computational instance 322, for sake of simplicity. Computational instance 322 includes CMDB 500. As described above, CMDB 500 may include representations of configuration items 802, including multiple discovered attribute values for each. CMDB 500 may correspond to and/or be stored in persistent storage 602.

Cloud 806 is an optional component that might not be present when vulnerability scanner 804 stores the results of scans locally. However, when present, cloud 806 receives these results, and cloud 806 may store and assess the results. For instance, cloud 806 may identify vulnerabilities based on the operating system and version thereof, operating system configuration, software application and version thereof, software configuration, and possibly other metrics as well. The identified vulnerabilities may be stored and then made available by way of an interface, such as a web-based graphical user interface, a JavaScript Object Notation (JSON) interface, an XML interface, or some other form of interface.

In particular, computational instance 322 may be configured to obtain the identified vulnerabilities from cloud 806, or from vulnerability scanner 806 by way of proxy server(s) 312. Computational instance 322 may combine this information with additional information from CMDB 500 to provide various metrics (e.g., risk score) per vulnerability. These metrics may be used to prioritize how security managers of managed network 300 address vulnerabilities.

IX. Example Operations

Figure 9:
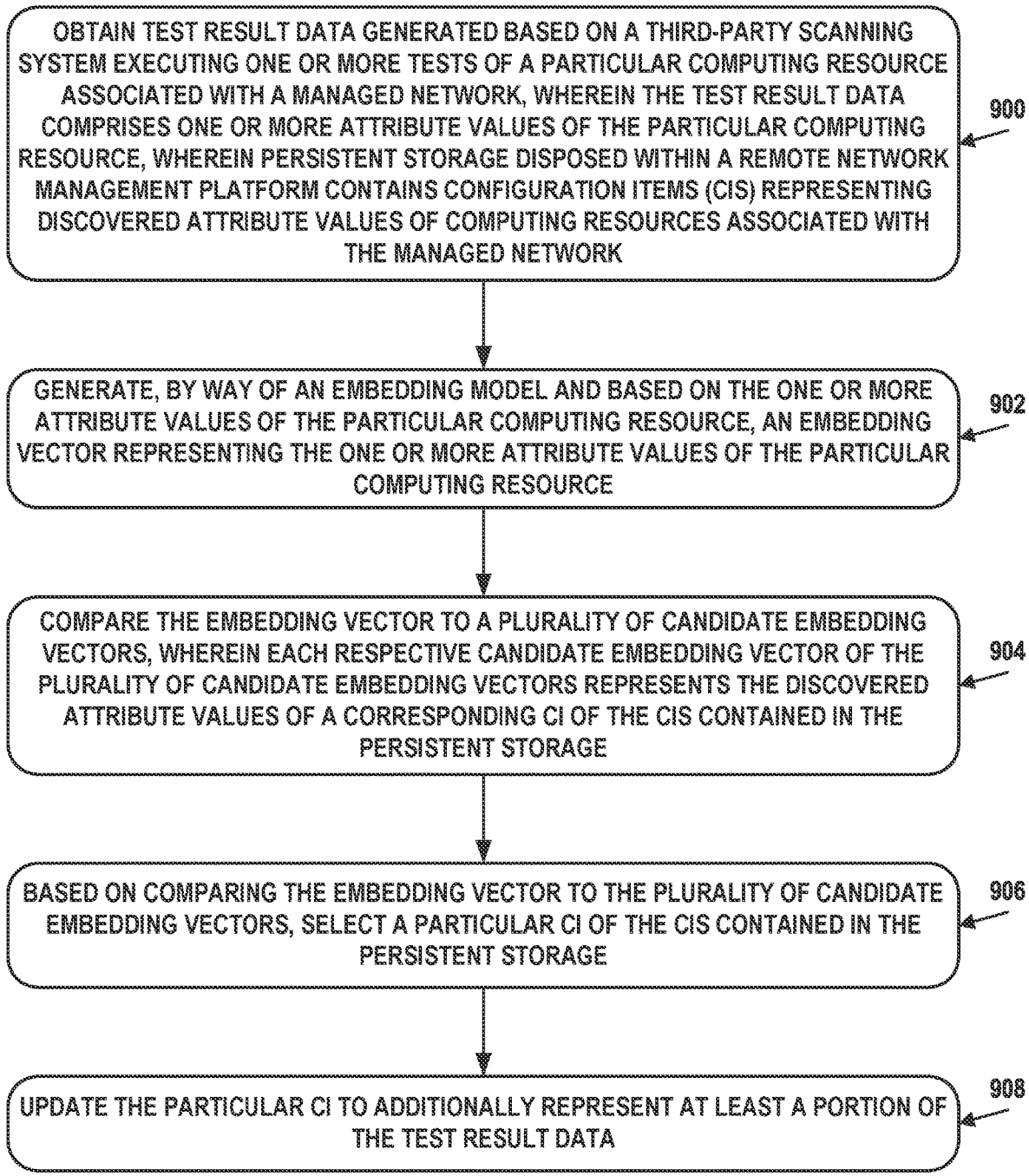
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 involves obtaining test result data generated based on a third-party scanning system executing one or more tests of a particular computing resource associated with a managed network. The test result data may include one or more attribute values of the particular computing resource. Persistent storage disposed within a remote network management platform may contain CIs representing discovered attribute values of computing resources associated with the managed network.

Block 902 involves generating, by way of an embedding model and based on the one or more attribute values of the particular computing resource, an embedding vector representing the one or more attribute values of the particular computing resource.

Block 904 involves comparing the embedding vector to a plurality of candidate embedding vectors. Each respective candidate embedding vector of the plurality of candidate embedding vectors may represent the discovered attribute values of a corresponding CI of the CIs contained in the persistent storage.

Block 906 involves, based on comparing the embedding vector to the plurality of candidate embedding vectors, selecting a particular CI of the CIs contained in the persistent storage.

Block 908 involves updating the particular CI to additionally represent at least a portion of the test result data.

In some embodiments, the third-party scanning system may be a vulnerability scanning system configured to scan the computing resources associated with the managed network for vulnerabilities.

In some embodiments, obtaining the test result data may include receiving the test result data from the third-party scanning system in response to completion of execution of the one or more tests of the particular computing resource. The one or more tests may be configured to determine the one or more attribute values of the particular computing resource.

In some embodiments, obtaining the test result data may include retrieving, from the persistent storage, an unmatched CI generated to represent the test result data and the one or more attribute values of the particular computing resource. The unmatched CI may be generated based on one or more rule-based algorithms determining that the one or more attribute values of the particular computing resource do not correspond to the discovered attribute values of the computing resources associated with the managed network.

In some embodiments, updating the particular CI to additionally represent at least the portion of the test result data may include updating the particular CI based on the unmatched CI and deleting the unmatched CI.

In some embodiments, comparing the embedding vector to the plurality of candidate embedding vectors may include generating, for each respective candidate embedding vector of the plurality of candidate embedding vectors, a corresponding similarity metric between the embedding vector and the respective candidate embedding vector.

In some embodiments, the corresponding similarity metric may be a Euclidean distance between the embedding vector and the respective candidate embedding vector.

In some embodiments, selecting the particular CI of the CIs contained in the persistent storage may include determining that the corresponding similarity metric associated with the particular CI exceeds a threshold similarity value, and selecting the particular CI based on determining that the corresponding similarity metric associated with the particular CI exceeds the threshold similarity value.

In some embodiments, selecting the particular CI of the CIs contained in the persistent storage may include determining that the corresponding similarity metric associated with the particular CI is a highest similarity metric of the corresponding similarity metrics generated for the plurality of candidate embedding vectors, and selecting the particular CI based on determining that the corresponding similarity metric associated with the particular CI is the highest similarity metric.

In some embodiments, selecting the particular CI of the CIs contained in the persistent storage may include displaying, by way of a user interface and for each respective candidate embedding vector of at least a subset of the plurality of candidate embedding vectors, results of comparing the embedding vector to the respective candidate embedding vector, and receiving, by way of the user interface, a selection of the particular CI.

In some embodiments, the one or more attribute values of the particular computing resource may include one or more of: (i) an attribute value representing an identifier assigned to the particular computing resource by the third-party scanning system, (ii) an attribute value representing an identifier assigned to the particular computing resource by a NetBIOS, (iii) an attribute value representing a name associated with the particular computing resource, (iv) an attribute value representing at least a portion of an FQDN associated with the particular computing resource (v) an attribute value representing an internet protocol (IP) address associated with the particular computing resource, or (vi) an attribute value representing a DNS entry associated with the particular computing resource.

In some embodiments, the embedding vector may include a plurality of dimensions and, for each respective dimension of the plurality of dimensions, a corresponding embedding value. Each respective attribute value of the one or more attribute values of the particular computing resource may be represented by corresponding one or more dimensions of the plurality of dimensions of the embedding vector.

In some embodiments, the corresponding one or more dimensions representing the respective attribute value may be predefined and may include a subset of the plurality of dimensions. The one or more dimensions may represent the respective attribute value exclusively of other attribute values of the one or more attribute values of the particular computing resource.

In some embodiments, each respective attribute value of the one or more attribute values of the particular computing resource may be represented by a corresponding character string. The embedding model may be a character string embedding model configured to generate the embedding vector based on the corresponding character strings that represent the one or more attribute values.

In some embodiments, the discovered attribute values of the computing resources associated with the managed network may correspond to a first set of attributes. The one or more tests may be configured to determine attribute values of a subset of the first set of attributes. The embedding model may be trained based on training attribute values selected from a subset of the discovered attribute values corresponding to the subset of the first set of attributes.

In some embodiments, the remote network management platform may be configured to manage a plurality of managed networks. Each respective managed network of the plurality of managed networks may be associated with a corresponding embedding model trained based on the CIs representing discovered attribute values of computing resources associated with the respective managed network.

In some embodiments, the embedding model may be trained to generate embedding vectors such that respective embedding vectors representing corresponding attribute values having at least a threshold degree of semantic similarity are separated from one another by no more than a threshold distance in a vector space defined by the embedding model.

In some embodiments, the embedding model may be retrained based on changes over time to the discovered attribute values of computing resources associated with the managed network.

In some embodiments, the embedding model may include an artificial neural network.

In some embodiments, additional test result data generated based on the third-party scanning system executing one or more tests of an additional computing resource associated with the managed network may be obtained. The additional test result data may include additional one or more attribute values of the additional computing resource. An additional embedding vector representing the additional one or more attribute values of the additional computing resource may be generated by way of the embedding model and based on the additional one or more attribute values of the additional computing resource. The additional embedding vector may be compared to the plurality of candidate embedding vectors. Based on comparing the additional embedding vector to the plurality of candidate embedding vectors, it may be determined that the additional computing resource does not correspond to any of the CIs contained in the persistent storage. A new CI may be generated to represent the additional computing resource and at least a portion of the additional test result data.

In some embodiments, a computing system may include means for obtaining test result data generated based on a third-party scanning system executing one or more tests of a particular computing resource associated with a managed network. The test result data may include one or more attribute values of the particular computing resource. Persistent storage disposed within a remote network management platform may contain CIs representing discovered attribute values of computing resources associated with the managed network. The computing system may also include means for generating, based on the one or more attribute values of the particular computing resource, an embedding vector representing the one or more attribute values of the particular computing resource. The computing system may additionally include means for comparing the embedding vector to a plurality of candidate embedding vectors. Each respective candidate embedding vector of the plurality of candidate embedding vectors may represent the discovered attribute values of a corresponding CI of the CIs contained in the persistent storage. The computing system may further include means for, based on comparing the embedding vector to the plurality of candidate embedding vectors, selecting a particular CI of the CIs contained in the persistent storage. The computing system may yet further include means for updating the particular CI to additionally represent at least a portion of the test result data.

X. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
    persistent storage containing configuration items (CIs) representing a plurality of attribute values of computing resources; and
    a processor configured to perform operations comprising:
    obtaining two or more attribute values of a particular computing resource;
    generating, using a machine learning model and based on one or more attribute values of the two or more attribute values of the particular computing resource, an embedding vector representing the one or more attribute values of the particular computing resource;
    comparing the embedding vector to one or more candidate embedding vectors, wherein each respective candidate embedding vector of the one or more candidate embedding vectors represents at least one attribute value of a corresponding CI of the CIs contained in the persistent storage;
    based on comparing the embedding vector to the one or more candidate embedding vectors, selecting a particular CI of the CIs contained in the persistent storage; and
    updating the particular CI to additionally represent at least one of the two or more attribute values of the particular computing resource.

2. The computing system of claim 1, wherein the plurality of attribute values of the computing resources are determined by a remote network management platform by executing a discovery process with respect to a managed network containing the computing resources.

3. The computing system of claim 2, wherein obtaining the two or more attribute values comprises:
    obtaining the two or more attribute values of the particular computing resource from a third-party system configured to scan the managed network.

4. The computing system of claim 3, wherein the third-party system is a vulnerability scanning system configured to scan the managed network for vulnerabilities, and wherein obtaining the two or more attribute values comprises:
    receiving test result data from the third-party system in response to completion of execution of one or more tests of the particular computing resource, wherein the one or more tests are configured to determine the two or more attribute values of the particular computing resource.

5. The computing system of claim 1, wherein obtaining the two or more attribute values comprises:
    retrieving, from the persistent storage, an unmatched CI generated to represent the one or more attribute values of the particular computing resource, wherein the unmatched CI is generated based on one or more rule-based algorithms determining that the one or more attribute values of the particular computing resource do not correspond to the plurality of attribute values of the computing resources.

6. The computing system of claim 5, wherein updating the particular CI to additionally represent at least one of the two or more attribute values of the particular computing resource comprises:
    updating the particular CI based on the unmatched CI; and
    deleting the unmatched CI.

7. The computing system of claim 1, wherein comparing the embedding vector to the one or more candidate embedding vectors comprises:
    generating, for each respective candidate embedding vector of the one or more candidate embedding vectors, a corresponding similarity metric between the embedding vector and the respective candidate embedding vector.

8. The computing system of claim 7, wherein the corresponding similarity metric is one or more of (i) a Euclidean distance between the embedding vector and the respective candidate embedding vector or (ii) a cosine distance between the embedding vector and the respective candidate embedding vector.

9. The computing system of claim 7, wherein selecting the particular CI of the CIs contained in the persistent storage comprises:
- determining that the corresponding similarity metric associated with the particular CI exceeds a threshold similarity value; and
- selecting the particular CI based on determining that the corresponding similarity metric associated with the particular CI exceeds the threshold similarity value.

10. The computing system of claim 7, wherein selecting the particular CI of the CIs contained in the persistent storage comprises:
- determining that the corresponding similarity metric associated with the particular CI is a highest similarity metric of the corresponding similarity metrics generated for the one or more candidate embedding vectors; and
- selecting the particular CI based on determining that the corresponding similarity metric associated with the particular CI is the highest similarity metric.

11. The computing system of claim 1, wherein selecting the particular CI of the CIs contained in the persistent storage comprises:
- displaying, by way of a user interface and for each respective candidate embedding vector of the one or more candidate embedding vectors, results of comparing the embedding vector to the respective candidate embedding vector; and
- receiving, by way of the user interface, a selection of the particular CI.

12. The computing system of claim 1, wherein the one or more attribute values of the particular computing resource represent one or more of: (i) an identifier assigned to the particular computing resource by a third-party scanning system, (ii) an identifier assigned to the particular computing resource by a Network Basic Input/Output System (NetBIOS), (iii) a name associated with the particular computing resource, (iv) at least a portion of a fully qualified domain name (FQDN) associated with the particular computing resource (v) an internet protocol (IP) address associated with the particular computing resource, or (vi) a domain name system (DNS) entry associated with the particular computing resource.

13. The computing system of claim 1, wherein the embedding vector comprises a plurality of dimensions and, for each respective dimension of the plurality of dimensions, a corresponding embedding value, wherein each respective attribute value of the one or more attribute values of the particular computing resource is represented by a corresponding one or more dimensions of the plurality of dimensions of the embedding vector.

14. The computing system of claim 13, wherein the corresponding one or more dimensions representing the respective attribute value are predefined and comprise a subset of the plurality of dimensions, and wherein the one or more dimensions represent the respective attribute value exclusively of other attribute values of the one or more attribute values of the particular computing resource.

15. The computing system of claim 1, wherein each respective attribute value of the one or more attribute values of the particular computing resource is represented by a corresponding character string, and wherein the machine learning model is configured to generate the embedding vector based on one or more corresponding character strings that represent the one or more attribute values.

16. The computing system of claim 1, wherein the plurality of attribute values of the computing resources corresponds to a first set of attributes, wherein the one or more attribute values of the particular computing resource correspond to a subset of the first set of attributes, and wherein the machine learning model is trained based on training attribute values corresponding to the subset of the first set of attributes.

17. The computing system of claim 1, wherein generating the embedding vector comprises:
- selecting, based on a managed network to which the particular computing resource belongs, the machine learning model from a plurality of machine learning models corresponding to a plurality of managed networks, wherein each respective machine learning model of the plurality of machine learning models is trained based on CIs representing training attribute values of computing resources of a corresponding managed network.

18. The computing system of claim 1, wherein the machine learning model is retrained based on changes over time to the plurality of attribute values of the computing resources.

19. A computer-implemented method comprising:
- obtaining two or more attribute values of a particular computing resource, wherein persistent storage contains configuration items (CIs) representing a plurality of attribute values of computing resources;
- generating, using a machine learning model and based on one or more attribute values of the two or more attribute values of the particular computing resource, an embedding vector representing the one or more attribute values of the particular computing resource;
- comparing the embedding vector to one or more candidate embedding vectors, wherein each respective candidate embedding vector of the one or more candidate embedding vectors represents at least one attribute value of a corresponding CI of the CIs contained in the persistent storage;
- based on comparing the embedding vector to the one or more candidate embedding vectors, selecting a particular CI of the CIs contained in the persistent storage; and
- updating the particular CI to additionally represent at least one of the two or more attribute values of the particular computing resource.

20. A non-transitory computer-readable medium having stored thereon instructions that, when executed by a computing system, cause the computing system to perform operations comprising:
- obtaining two or more attribute values of a particular computing resource, wherein persistent storage contains configuration items (CIs) representing a plurality of attribute values of computing resources;
- generating, using a machine learning model and based on the one or more attribute values of the two or more attribute values of the particular computing resource, an embedding vector representing the one or more attribute values of the particular computing resource;
- comparing the embedding vector to one or more candidate embedding vectors, wherein each respective candidate embedding vector of the one or more candidate embedding vectors represents at least one attribute value of a corresponding CI of the CIs contained in the persistent storage;

based on comparing the embedding vector to the one or more candidate embedding vectors, selecting a particular CI of the CIs contained in the persistent storage; and updating the particular CI to additionally represent at least one of the two or more attribute values of the particular computing resource.

\* \* \* \* \*